(12) United States Patent
Kubo

(10) Patent No.: US 11,585,968 B2
(45) Date of Patent: Feb. 21, 2023

(54) OPTICAL FILTER AND CAMERA-EQUIPPED INFORMATION DEVICE

(71) Applicant: Nippon Sheet Glass Company, Limited, Tokyo (JP)

(72) Inventor: Yuichiro Kubo, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 314 days.

(21) Appl. No.: 16/633,099

(22) PCT Filed: Jun. 12, 2018

(86) PCT No.: PCT/JP2018/022491
§ 371 (c)(1),
(2) Date: Jan. 22, 2020

(87) PCT Pub. No.: WO2019/021666
PCT Pub. Date: Jan. 31, 2019

(65) Prior Publication Data
US 2020/0233130 A1 Jul. 23, 2020

(30) Foreign Application Priority Data
Jul. 27, 2017 (JP) .............................. JP2017-145542

(51) Int. Cl.
*G02B 5/22* (2006.01)
*G02B 5/20* (2006.01)
(Continued)

(52) U.S. Cl.
CPC .............. *G02B 5/208* (2013.01); *G02B 5/22* (2013.01); *G02B 5/223* (2013.01); *G02B 5/282* (2013.01); *G03B 11/043* (2013.01)

(58) Field of Classification Search
CPC .......... G02B 5/208; G02B 5/22; G02B 5/223; G02B 5/282; G02B 1/115; G03B 11/043; G03B 11/00; G03B 11/04
See application file for complete search history.

(56) References Cited

U.S. PATENT DOCUMENTS 5,764,416 A * 6/1998 Rahn ...................... G02B 1/115
216/24
6,168,825 B1 * 1/2001 O'Brien .............. C23C 18/1855
427/160
(Continued)

FOREIGN PATENT DOCUMENTS

CN 205157947 4/2016
EP 1672047 A1 * 6/2006 ............... G02B 5/22
(Continued)

OTHER PUBLICATIONS

International Search Report and Written Opinion issued for International Patent Application No. PCT/JP2018/022491, dated Sep. 11, 2018, 10 pages including English translation of Search Report.
(Continued)

*Primary Examiner* — Balram T Parbadia
(74) *Attorney, Agent, or Firm* — Hamre, Schumann, Mueller & Larson, P.C.

(57) ABSTRACT

An optical filter (1a) includes a light-absorbing layer and satisfies the following requirements (i) to (iii) when light with wavelengths of 300 nm to 1200 nm is incident at an incident angle of 0°: (i) an average transmittance of 78% or more in the wavelength range of 450 nm to 600 nm; (ii) a spectral transmittance of 1% or less in the wavelength range of 750 nm to 1080 nm; and (iii) a decreasing spectral transmittance with increasing wavelength in the wavelength range of 600 nm to 750 nm and a first IR cut-off wavelength in the wavelength range of 620 nm to 680 nm. The require-
(Continued)

ment (i), the requirement (ii), and the requirement (iii) are satisfied by the light-absorbing layer (10).

14 Claims, 6 Drawing Sheets

(51) Int. Cl.
*G02B 5/28* (2006.01)
*G03B 11/04* (2021.01)

(56) References Cited

U.S. PATENT DOCUMENTS

| | | | |
|---|---|---|---|
| 7,025,908 B1 | 4/2006 | Hayashi et al. | |
| 11,300,719 B2 | 4/2022 | Kubo et al. | |
| 2004/0165098 A1* | 8/2004 | Ikeda | H01L 31/02327 |
| | | | 257/E31.127 |
| 2005/0035336 A1* | 2/2005 | Kuwabara | G02B 5/208 |
| | | | 252/587 |
| 2010/0210772 A1* | 8/2010 | Hiwatashi | G02B 5/22 |
| | | | 524/406 |
| 2010/0220377 A1* | 9/2010 | Yamada | H01L 27/14621 |
| | | | 359/241 |
| 2011/0042771 A1* | 2/2011 | Huang | G03F 7/11 |
| | | | 257/E31.119 |
| 2012/0243077 A1 | 9/2012 | Osawa et al. | |
| 2014/0063597 A1* | 3/2014 | Shimmo | G02B 5/208 |
| | | | 359/359 |
| 2014/0300956 A1* | 10/2014 | Kubo | G02B 5/223 |
| | | | 359/359 |
| 2014/0350146 A1 | 11/2014 | Tsubouchi | |
| 2015/0160386 A1 | 6/2015 | Takemura | |
| 2015/0293283 A1 | 10/2015 | Nara et al. | |
| 2015/0293284 A1 | 10/2015 | Tatemura | |
| 2015/0331163 A1* | 11/2015 | Iwasaki | G02B 5/208 |
| | | | 359/359 |
| 2016/0116653 A1* | 4/2016 | Murayama | H01L 27/14618 |
| | | | 359/359 |
| 2016/0170105 A1 | 6/2016 | Nagaya et al. | |
| 2016/0195651 A1 | 7/2016 | Yoshioka et al. | |
| 2016/0326043 A1 | 11/2016 | Sun | |
| 2017/0017023 A1* | 1/2017 | Sugiyama | H01L 27/14618 |
| 2017/0066933 A1 | 3/2017 | Shiono et al. | |
| 2017/0146708 A1 | 5/2017 | Lah | |
| 2017/0184765 A1 | 6/2017 | Shiono et al. | |
| 2017/0343710 A1 | 11/2017 | Shiono et al. | |
| 2018/0003872 A1 | 1/2018 | Kubo et al. | |
| 2018/0114805 A1* | 4/2018 | Takiguchi | G02B 5/208 |
| 2018/0282521 A1 | 10/2018 | Kubo et al. | |
| 2018/0346729 A1 | 12/2018 | Miyake et al. | |
| 2019/0219749 A1 | 7/2019 | Shimmo et al. | |
| 2020/0040161 A1 | 2/2020 | Kubo et al. | |

FOREIGN PATENT DOCUMENTS

| | | |
|---|---|---|
| JP | H1152127 | 2/1999 |
| JP | 2001154015 | 6/2001 |
| JP | 2002069305 A | 3/2002 |
| JP | 2005325292 | 11/2005 |
| JP | 2009242650 A | 10/2009 |
| JP | 2011203467 | 10/2011 |
| JP | 2011227528 | 11/2011 |
| JP | 2013156460 | 8/2013 |
| JP | 2014191346 | 10/2014 |
| JP | 2015043061 | 3/2015 |
| JP | 2015229743 A | 12/2015 |
| JP | 2016157123 | 9/2016 |
| JP | 6087464 | 3/2017 |
| JP | 6232161 B1 | 11/2017 |
| JP | 6267823 | 1/2018 |
| JP | 2019012121 A | 1/2019 |
| WO | 9926952 | 6/1999 |
| WO | 2011071052 | 6/2011 |
| WO | 2014034386 | 3/2014 |
| WO | 2014104370 | 7/2014 |
| WO | 2015056734 A1 | 4/2015 |
| WO | 2015099060 | 7/2015 |
| WO | 2016043166 | 3/2016 |
| WO | 2016114362 A1 | 7/2016 |
| WO | 2016133099 A1 | 8/2016 |
| WO | 2017006571 | 1/2017 |
| WO | 2017051512 | 3/2017 |
| WO | 2017094858 | 6/2017 |
| WO | 2017135359 A1 | 8/2017 |
| WO | 2018021222 | 2/2018 |
| WO | 2018155634 A1 | 8/2018 |
| WO | 2018221424 | 12/2018 |

OTHER PUBLICATIONS

International Search Report and Written Opinion issued for International Patent Application No. PCT/JP2018/022490, dated Sep. 11, 2018, 9 pages including English translation of Search Report.

* cited by examiner

OPTICAL FILTER AND CAMERA-EQUIPPED INFORMATION DEVICE

TECHNICAL FIELD

The present invention relates to an optical filter and a camera-equipped information device.

BACKGROUND ART

In imaging apparatuses employing an imaging sensor such as a charge coupled device (CCD) or a complementary metal oxide semiconductor (CMOS), any of various optical filters is disposed ahead of the imaging sensor in order to obtain an image with good color reproduction. Imaging sensors generally have spectral sensitivity over a wide wavelength range from the ultraviolet to infrared regions. The visual sensitivity of humans lies solely in the visible region. Thus, a technique is known in which an optical filter shielding against infrared light is disposed ahead of an imaging sensor in an imaging apparatus in order to allow the spectral sensitivity of the imaging sensor to approximate to the visual sensitivity of humans.

There are the following types of optical filters: optical filters using light reflection; and optical filters using light absorption. Examples of the former include an optical filter including a dielectric multilayer film, and examples of the latter include an optical filter including a film containing a light absorber capable of absorbing light with a given wavelength. The latter are desirable in view of their spectral properties less likely to vary depending on the incident angle of incident light.

For example, Patent Literature 1 describes a near-infrared-absorbing filter formed of a near-infrared absorber and resin. The near-infrared absorber is obtained from a particular phosphonic acid compound, particular phosphoric acid ester compound, and copper salt. The particular phosphonic acid compound has a monovalent group $R^1$ bonded to a phosphorus atom P and represented by $—CH_2CH_2—R^{11}$. $R^{11}$ represents a hydrogen atom, an alkyl group having 1 to 20 carbon atoms, or a fluorinated alkyl group having 1 to 20 carbon atoms.

CITATION LIST

Patent Literature

Literature 1: JP 2011-203467 A

SUMMARY OF INVENTION

Technical Problem

Although the near-infrared-absorbing filter described in Patent Literature 1 can effectively absorb light with wavelengths of 800 nm to 1200 nm, it is difficult to say that the near-infrared-absorbing filter described in Patent Literature 1 has desirable light absorption properties in the wavelength range of 650 nm to 800 nm. Therefore, the present invention provides an optical filter capable of exhibiting, with a simple configuration, desirable optical characteristics that are unachievable by only the near-infrared-absorbing filter described in Patent Literature 1.

Solution to Problem

The present invention provides an optical filter including:
a light-absorbing layer, wherein
when light with wavelengths of 300 nm to 1200 nm is incident at an incident angle of 0°, (i) the optical filter has an average transmittance of 78% or more in the wavelength range of 450 nm to 600 nm, (ii) the optical filter has a spectral transmittance of 1% or less in the wavelength range of 750 nm to 1080 nm, (iii) the optical filter has a decreasing spectral transmittance with increasing wavelength in the wavelength range of 600 nm to 750 nm and a first IR cut-off wavelength which lies in the wavelength range of 600 nm to 750 nm and at which the spectral transmittance is 50% is in the wavelength range of 620 nm to 680 nm, and the requirement (i), the requirement (ii), and the requirement (iii) are satisfied by the light-absorbing layer.

Advantageous Effects of Invention

The above optical filter can exhibit the desirable optical characteristics with a simple configuration.

DESCRIPTION OF EMBODIMENTS

Hereinafter, embodiments of the present invention will be described with reference to the drawings. The following description is directed to some examples of the present invention, and the present invention is not limited by these examples.

In some cases, it is desirable for optical filters to have properties of permitting transmission of light with wavelengths of 450 nm to 600 nm and cutting off light with wavelengths of 650 nm to 1100 nm. However, for example, the optical filter described in Patent Literature 1 does not have sufficient light absorption properties in the wavelength range of 650 nm to 800 nm, and a light-absorbing layer or light-reflecting film is additionally needed to cut off light with wavelengths of 650 nm to 800 nm. Alternatively, a substrate which is made of, for example, infrared-absorbing glass and which is suitable for cutting off light with wavelengths of 650 nm to 800 nm needs to be used in combination. As just described, it is difficult to achieve an optical filter having the above desirable properties with a simple structure (for example, one light-absorbing layer). In fact, the present inventor went through much trial and error to achieve an optical filter having the above desirable properties with a simple structure. That eventually led the present inventor to the optical filter according to the present invention.

Figure 1A:
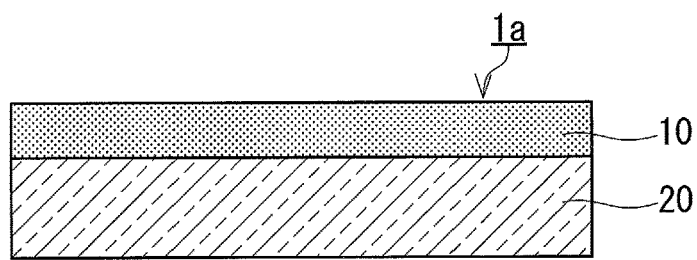
FIG. 1A is a cross-sectional view showing an example of an optical filter of the present invention.

As shown in FIG. 1A, an optical filter 1a includes a light-absorbing layer 10. The optical filter 1a satisfies the following requirements (i) to (iii) when light with wavelengths of 300 nm to 1200 nm is incident at an incident angle of 0°. In the optical filter 1a, the following requirement (i), the following requirement (ii), and the following requirement (iii) are satisfied by the light-absorbing layer 10.

(i) An average transmittance of 78% or more in the wavelength range of 450 nm to 600 nm (ii) A spectral transmittance of 1% or less in the wavelength range of 750 nm to 1080 nm (iii) A decreasing spectral transmittance with increasing wavelength in the wavelength range of 600 nm to 750 nm and a first IR cut-off wavelength in the wavelength range of 620 nm to 680 nm Herein, the term "spectral transmittance" refers to the transmittance obtained when light with a given wavelength is incident on an object such as a specimen, the term "average transmittance" refers to an average of the spectral transmittances in a given wavelength range, and the term "maximum transmittance" refers to the maximum spectral transmittance in a given wavelength range. Additionally, the term "transmittance spectrum" herein refers to one in which spectral transmittances at wavelengths in a given wavelength range are arranged in the wavelength order.

Herein, the term "IR cut-off wavelength" refers to a wavelength at which the spectral transmittance is 50% when light with wavelengths of 300 nm to 1200 nm is incident on an optical filter at a given incident angle and which lies in the wavelength range of 600 nm or more. The term "first IR cut-off wavelength" refers to an IR cut-off wavelength for light incident on an optical filter at an incident angle of 0°. Additionally, the term "UV cut-off wavelength" refers to a wavelength at which the spectral transmittance is 50% when light with wavelengths of 300 nm to 1200 nm is incident on an optical filter at a given incident angle and which lies in the wavelength range of 450 nm or less. The term "first UV cut-off wavelength" is a UV cut-off wavelength for light incident on an optical filter at an incident angle of 0°.

As the optical filter 1a satisfies the above requirements (i) to (iii), the optical filter 1a permits transmission of a large amount of light with wavelengths of 450 nm to 600 nm and can effectively cut off light with wavelengths of 650 nm to 1100 nm. Therefore, a transmittance spectrum of the optical filter 1a conforms better to the visual sensitivity of humans than does a transmittance spectrum of the near-infrared-absorbing filter described in Patent Literature 1. Moreover, in the optical filter 1a, the requirements (i) to (iii) are satisfied by the light-absorbing layer 10.

As to the above (i), the optical filter 1a desirably has an average transmittance of 80% or more and more desirably has an average transmittance of 82% or more in the wavelength range of 450 nm to 600 nm.

As to the above (iii), the first IR cut-off wavelength desirably lies in the wavelength range of 630 nm to 650 nm. In this case, a transmittance spectrum of the optical filter 1a conforms better to the visual sensitivity of humans.

The optical filter 1a desirably satisfies the following requirement (iv) when light with wavelengths of 300 nm to 1200 nm is incident at an incident angle of 0°. In this case, the optical filter 1a can effectively cut off light in the ultraviolet region, and a transmittance spectrum of the optical filter 1a conforms better to the visual sensitivity of humans.

(iv) A spectral transmittance of 1% or less in the wavelength range of 300 to 350 nm As to the above (iv), in the optical filter 1a, the requirement (iv) is desirably satisfied by the light-absorbing layer 10.

As to the above (iv), the optical filter 1a desirably has a spectral transmittance of 1% or less in the wavelength range of 300 nm to 360 nm when light with wavelengths of 300 nm to 1200 nm is incident at an incident angle of 0°.

The optical filter 1a desirably satisfies the following requirement (v) when light with wavelengths of 300 nm to 1200 nm is incident at an incident angle of 0°. In this case, a transmittance spectrum of the optical filter 1a conforms better to the visual sensitivity of humans.

(v) An increasing spectral transmittance with increasing wavelength in the wavelength range of 350 nm to 450 nm and a first UV cut-off wavelength in the wavelength range of 380 nm to 430 nm As to the above (v), in the optical filter 1a, the requirement (v) is desirably satisfied by the light-absorbing layer 10.

As to the above (v), the first UV cut-off wavelength desirably lies in the wavelength range of 390 nm to 420 nm. In this case, a transmittance spectrum of the optical filter 1a conforms better to the visual sensitivity of humans.

The optical filter 1a desirably satisfies the following requirement (vi) when light with wavelengths of 300 nm to 1200 nm is incident at an incident angle of 0°. The optical filter 1a can thus shield against infrared light with a relatively long wavelength (a wavelength of 1000 to 1100 nm). Conventionally, a light-reflecting film formed of a dielectric multilayer film is commonly used to cut off light with such a wavelength. Unlike the conventional case, the optical filter 1a can effectively cut off light with such a wavelength without using a dielectric multilayer film. Even when a light-reflecting film formed of a dielectric multilayer film is necessary, the optical filter 1a can lower a reflection performance level required of the light-reflecting film. Therefore, the number of dielectrics laminated in the light-reflecting film can be decreased and the cost needed to form the light-reflecting film can be decreased. In the optical filter 1a, the requirement (vi) is satisfied desirably by the light-absorbing layer 10.

(vi) A spectral transmittance of 3% or less in the wavelength range of 1000 to 1100 nm The optical filter 1a desirably satisfies the following requirement (vii) when light with wavelengths of 300 nm to 1200 nm is incident at an incident angle of 0°. In this case, infrared light with a longer wavelength (1100 to 1200 nm) can be cut off. This allows the optical filter 1a to effectively cut off light with such a wavelength without using a dielectric multilayer film or with a small number of dielectrics laminated in a dielectric multilayer film. In the optical filter 1a, the requirement (vii) is satisfied desirably by the light-absorbing layer 10.

(vii) A spectral transmittance of 15% or less in the wavelength range of 1100 to 1200 nm For example, in the optical filter 1a, an absolute value of a difference between a second IR cut-off wavelength and the first IR cut-off wavelength is 10 nm or less (requirement (viii)). The second IR cut-off wavelength is an IR cut-off wavelength obtained when light with wavelengths of 300 nm to 1200 nm is incident on the optical filter 1a at an incident angle of 40°. In this case, the transmittance properties of the optical filter 1a in the vicinity of the first IR cut-off wavelength are less likely to vary with the incident angle of light incident on the optical filter 1a. Consequently, a central portion and peripheral portion of an image obtained using an imaging apparatus in which the optical filter 1a is disposed ahead of an imaging sensor can be prevented from presenting unintended color tones.

In the optical filter 1a, the absolute value of the difference between the second IR cut-off wavelength and first IR cut-off wavelength is desirably 5 nm or less.

For example, in the optical filter 1a, an absolute value of a difference between a third IR cut-off wavelength and the first IR cut-off wavelength is 15 nm or less (requirement (ix)). The third IR cut-off wavelength is an IR cut-off wavelength obtained when light with wavelengths of 300 nm to 1200 nm is incident on the optical filter 1a at an incident angle of 50°. In this case, even when the incident angle of light incident on the optical filter 1a greatly changes, variation in transmittance properties in the vicinity of the first IR cut-off wavelength of the optical filter 1a can be reduced. Consequently, high-quality images can be easily obtained when the optical filter 1a is disposed ahead of an imaging sensor in an imaging apparatus capable of capturing images at a wide angle of view.

For example, in the optical filter 1a, an absolute value of a difference between a fourth IR cut-off wavelength and the first IR cut-off wavelength is 20 nm or less. The fourth IR cut-off wavelength is an IR cut-off wavelength obtained when light with wavelengths of 300 nm to 1200 nm is incident on the optical filter 1a at an incident angle of 60°. In this case, high-quality images can be easily obtained when the optical filter 1a is disposed ahead of an imaging sensor in an imaging apparatus capable of capturing images at a wide angle of view.

For example, in the optical filter 1a, an absolute value of a difference between a second UV cut-off wavelength and the first UV cut-off wavelength is 10 nm or less (requirement (x)). The second UV cut-off wavelength is a UV cut-off wavelength obtained when light with wavelengths of 300 nm to 1200 nm is incident on the optical filter 1a at an incident angle of 40°. In this case, the transmittance properties of the optical filter 1a in the vicinity of the first UV cut-off wavelength are less likely to vary with the incident angle of light incident on the optical filter 1a. Consequently, a central portion and peripheral portion of an image obtained using an imaging apparatus in which the optical filter 1a is disposed ahead of an imaging sensor can be prevented from presenting unintended color tones.

In the optical filter 1a, the absolute value of the difference between the second UV cut-off wavelength and first UV cut-off wavelength is desirably 5 nm or less.

For example, in the optical filter 1a, an absolute value of a difference between a third UV cut-off wavelength and the first UV cut-off wavelength is 15 nm or less (requirement (xi)). The third UV cut-off wavelength is a UV cut-off wavelength obtained when light with wavelengths of 300 nm to 1200 nm is incident on the optical filter 1a at an incident angle of 50°. In this case, even when the incident angle of light incident on the optical filter 1a greatly changes, variation in transmittance properties in the vicinity of the first UV cut-off wavelength of the optical filter 1a can be reduced. Consequently, high-quality images can be easily obtained when the optical filter 1a is disposed ahead of an imaging sensor in an imaging apparatus capable of capturing images at a wide angle of view.

For example, in the optical filter 1a, an absolute value of a difference between a fourth UV cut-off wavelength and the first UV cut-off wavelength is 20 nm or less. The fourth UV cut-off wavelength is a UV cut-off wavelength obtained when light with wavelengths of 300 nm to 1200 nm is incident on the optical filter 1a at an incident angle of 60°. In this case, high-quality images can be easily obtained when the optical filter 1a is disposed ahead of an imaging sensor in an imaging apparatus capable of capturing images at a wide angle of view.

The optical filter 1a desirably satisfies the following requirement (xii) when light with wavelengths of 300 nm to 1200 nm is incident at an incident angle of 0°. In the optical filter 1a, the requirement (xii) is satisfied desirably by the light-absorbing layer 10.

(xii) A spectral transmittance of 0.5% or less and more desirably a spectral transmittance of 0.1% or less in the wavelength range of 800 to 950 nm The optical filter 1a desirably further satisfies the following requirement (xiii) when light with wavelengths of 300 nm to 1200 nm is incident at an incident angle of 0°. In the optical filter 1a, the requirement (xiii) is satisfied desirably by the light-absorbing layer 10.

(xiii) A spectral transmittance of 0.5% or less and more desirably a spectral transmittance of 0.1% or less in the wavelength range of 800 to 1000 nm RGB color filters used in imaging apparatuses not only permit transmission of light in wavelength ranges of the corresponding RGB colors but sometimes permit transmission of light with wavelengths of 800 nm or more. Therefore, in the case where an infrared cut filter used in an imaging apparatus has a spectral transmittance not reduced to a certain level in the above wavelength range, light in the above wavelength range is incident on a pixel of an imaging sensor and a signal is output from the pixel. When the imaging apparatus is used to obtain a digital image under a sufficiently large amount of visible light, the obtained digital image is not greatly affected by a small amount of infrared light transmitted through a color filter and received by a pixel of the imaging sensor. However, such infrared light tends to have a stronger influence under a small amount of visible light or on a dark part of an image, and sometimes a bluish or reddish color is added to the image.

As described above, color filters used along with imaging sensors such as a CMOS and CCD permit transmission of light in the wavelength range of 800 to 950 nm or 800 to 1000 nm in some cases. The optical filter 1a satisfying the above requirements (xii) and (xiii) can prevent the above defect of images.

The light-absorbing layer 10 is not particularly limited as long as the light-absorbing layer 10 absorbs light in the given wavelength range so as to satisfy the above requirements (i) to (iii). The light-absorbing layer 10, for example, includes a light absorber formed by a phosphonic acid and copper ion.

When the light-absorbing layer 10 includes the light absorber formed by a phosphonic acid and copper ion, the phosphonic acid includes, for example, a first phosphonic acid having an aryl group. In the first phosphonic acid, the aryl group is bonded to a phosphorus atom. Thus, the optical filter 1a easily satisfies the above requirements (i) to (iii).

The aryl group of the first phosphonic acid is, for example, a phenyl group, benzyl group, toluyl group, nitrophenyl group, hydroxyphenyl group, halogenated phenyl group in which at least one hydrogen atom of a phenyl group is substituted by a halogen atom, or halogenated benzyl group in which at least one hydrogen atom of a benzene ring of a benzyl group is substituted by a halogen atom. The first phosphonic acid desirably includes a portion that has the halogenated phenyl group. In that case, the optical filter 1a easily satisfies the above requirements (i) to (iii) more reliably.

When the light-absorbing layer 10 includes the light absorber formed by the phosphonic acid and copper ion, the phosphonic acid desirably further includes a second phosphonic acid having an alkyl group. In the second phosphonic acid, the alkyl group is bonded to a phosphorus atom.

The alkyl group of the second phosphonic acid is, for example, an alkyl group having 6 or less carbon atoms. This alkyl group may be linear or branched.

When the light-absorbing layer 10 includes the light absorber formed by the phosphonic acid and copper ion, the light-absorbing layer 10 desirably further includes a phosphoric acid ester allowing the light absorber to be dispersed and matrix resin.

The phosphoric acid ester included in the light-absorbing layer 10 is not limited to any particular one, as long as the phosphoric acid ester allows good dispersion of the light absorber. For example, the phosphoric acid ester includes at least one of a phosphoric acid diester represented by the following formula (c1) and a phosphoric acid monoester represented by the following formula (c2). In the formulae (c1) and (c2), $R_{21}$, $R_{22}$, and $R_3$ are each a monovalent functional group represented by —$(CH_2CH_2O)_nR_4$, wherein n is an integer of 1 to 25 and $R_4$ is an alkyl group having 6 to 25 carbon atoms. $R_{21}$, $R_{22}$, and $R_3$ may be the same or different functional groups.

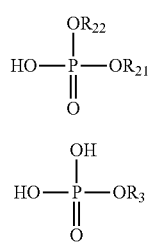

The phosphoric acid ester is not particularly limited. The phosphoric acid ester can be, for example, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), or PLYSURF A215C (polyoxyethylene tridecyl ether phosphoric acid ester). All of these are products manufactured by DKS Co., Ltd. The phosphoric acid ester can be NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). All of these are products manufactured by Nikko Chemicals Co., Ltd.

The matrix resin included in the light-absorbing layer 10 is, for example, a heat-curable or ultraviolet-curable resin in which the light absorber is dispersible. Additionally, as the matrix resin can be used a resin that has a transmittance of, for example, 70% or more, desirably 75% or more, and more desirably 80% or more for light with wavelengths of 350 nm to 900 nm in the form of a 0.1-mm-thick resin layer. The content of the phosphonic acid is, for example, 3 to 180 parts by mass with respect to 100 parts by mass of the matrix resin.

The matrix resin included in the light-absorbing layer 10 is not particularly limited as long as the above properties are satisfied. The matrix resin is, for example, a (poly)olefin resin, polyimide resin, polyvinyl butyral resin, polycarbonate resin, polyamide resin, polysulfone resin, polyethersulfone resin, polyamideimide resin, (modified) acrylic resin, epoxy resin, or silicone resin. The matrix resin may contain an aryl group such as a phenyl group and is desirably a silicone resin containing an aryl group such as a phenyl group. If the light-absorbing layer 10 is excessively hard (rigid), the likelihood of cure shrinkage-induced cracking during the production process of the optical filter 1a increases with increasing thickness of the light-absorbing layer 10. When the matrix resin is a silicone resin containing an aryl group, the light-absorbing layer 10 is likely to have high crack resistance. Moreover, with the use of a silicone resin containing an aryl group, the light absorber formed by the above phosphonic acid and copper ion is less likely to be aggregated when included. Further, when the matrix resin of the light-absorbing layer 10 is a silicone resin containing an aryl group, it is desirable for the phosphoric acid ester included in the light-absorbing layer 10 to have a flexible, linear organic functional group, such as an oxyalkyl group, just as does the phosphoric acid ester represented by the formula (c1) or formula (c2). This is because interaction derived from the combination of the above phosphonic acid, a silicone resin containing an aryl group, and phosphoric acid ester having a linear organic functional group such as an oxyalkyl group makes aggregation of the light absorber less likely and can impart good rigidity and good flexibility to the light-absorbing layer. Specific examples of the silicone resin available as the matrix resin include KR-255, KR-300, KR-2621-1, KR-211, KR-311, KR-216, KR-212, and KR-251. All of these are silicone resins manufactured by Shin-Etsu Chemical Co., Ltd.

As shown in FIG. 1A, the optical filter 1a further includes, for example, a transparent dielectric substrate 20. The transparent dielectric substrate 20 is covered with the light-absorbing layer 10. The transparent dielectric substrate 20 is not limited to any particular one as long as the transparent dielectric substrate 20 is a dielectric substrate having a high average transmittance (e.g., 80% or more) in the wavelength range of 450 nm to 600 nm.

The transparent dielectric substrate 20 is, for example, made of glass or resin. When the transparent dielectric substrate 20 is made of glass, the glass is, for example, borosilicate glass such as D 263, soda-lime glass (blue plate glass), white sheet glass such as B 270, alkali-free glass, or infrared-absorbing glass such as copper-containing phosphate glass or copper-containing fluorophosphate glass. When the transparent dielectric substrate 20 is made of infrared-absorbing glass such as copper-containing phosphate glass or copper-containing fluorophosphate glass, the desired infrared absorption performance can be imparted to the optical filter 1a by a combination of the infrared absorption performance of the transparent dielectric substrate 20 and the infrared absorption performance of the light-absorbing layer 10. Examples of such an infrared-absorbing glass include BG-60, BG-61, BG-62, BG-63, and BG-67 manufactured by SCHOTT AG, 500EXL manufactured by Nippon Electric Glass Co., Ltd., and CM5000, CM500, C5000, and C500S manufactured by HOYA CORPORATION. Moreover, the infrared-absorbing glass may have ultraviolet absorption properties.

The transparent dielectric substrate 20 may be a transparent crystalline substrate, such as magnesium oxide, sapphire, or quartz. For example, sapphire is very hard and is thus scratch resistant. Therefore, as a scratch-resistant protective material (protective filter), a sheet-shaped sapphire is sometimes disposed ahead of a camera module or lens included in mobile devices such as smartphones and mobile phones. Formation of the light-absorbing layer 10 on such a sheet-shaped sapphire makes it possible to protect camera modules and lenses and cut off light with wavelengths of 650 nm to 1100 nm. This eliminates the need to dispose an optical filter that exhibits performance of shielding against infrared light with wavelengths of 650 nm to 1100 nm around an imaging sensor such as a CCD or CMOS or inside a camera module. Therefore, the formation of the light-absorbing layer 10 on a sheet-shaped sapphire can contribute to achievement of camera modules reduced in profile.

When the transparent dielectric substrate 20 is made of resin, the resin is, for example, a (poly)olefin resin, polyimide resin, polyvinyl butyral resin, polycarbonate resin, polyamide resin, polysulfone resin, polyethersulfone resin, polyamideimide resin, (modified) acrylic resin, epoxy resin, or silicone resin.

The optical filter 1a can be produced, for example, by applying a composition (light-absorbing composition) for forming the light-absorbing layer 10 to one principal surface of the transparent dielectric substrate 20 to form a film and drying the film. The method for preparing the light-absorbing composition and the method for producing the optical filter 1a will be described with an example in which the light-absorbing layer 10 includes the light absorber formed by the phosphonic acid and copper ion.

First, an exemplary method for preparing the light-absorbing composition will now be described. A copper salt such as copper acetate monohydrate is added to a given solvent such as tetrahydrofuran (THF), and the mixture is stirred to give a copper salt solution. To this copper salt solution is then added a phosphoric acid ester compound such as a phosphoric acid diester represented by the formula (c1) or a phosphoric acid monoester represented by the formula (c2), and the mixture is stirred to prepare a solution A. A solution B is also prepared by adding the first phosphonic acid to a given solvent such as THF and stirring the mixture. When a plurality of phosphonic acids are used as the first phosphonic acid, the solution B may be prepared by adding each phosphonic acid to a given solvent such as THF, stirring the mixture, and mixing a plurality of preliminary liquids each prepared to contain a different phosphonic acid. In the preparation of the solution B, an alkoxysilane monomer is desirably added.

The addition of an alkoxysilane monomer to the light-absorbing composition can prevent particles of the light absorber from aggregating with each other. This enables the light absorber to be dispersed well in the light-absorbing composition even when the content of the phosphoric acid ester is decreased. When the light-absorbing composition is used to produce the optical filter 1a, a treatment is performed so that sufficient hydrolysis and polycondensation reactions of the alkoxysilane monomer occur. Owing to the treatment, a siloxane bond (—Si—O—Si—) is formed and the optical filter 1a has good moisture resistance. The optical filter 1a additionally has good heat resistance. This is because a siloxane bond is greater in binding energy and chemically more stable than bonds such as a —C—C— bond and —C—O— bond and is thus excellent in heat resistance and moisture resistance.

Next, the solution B is added to the solution A while the solution A is stirred, and the mixture is further stirred for a given period of time. To the resultant solution is then added a given solvent such as toluene, and the mixture is stirred to obtain a solution C. Subsequently, the solution C is subjected to solvent removal under heating for a given period of time to obtain a solution D. This process removes the solvent such as THF and the component such as acetic acid (boiling point: about 118° C.) generated by disassociation of the copper salt and yields a light absorber formed by the first phosphonic acid and copper ion. The temperature at which the solution C is heated is chosen based on the boiling point of the to-be-removed component disassociated from the copper salt. During the solvent removal, the solvent such as toluene (boiling point: about 110° C.) used to obtain the solution C is also evaporated. A certain amount of this solvent desirably remains in the light-absorbing composition. This is preferably taken into account in determining the amount of the solvent to be added and the time period of the solvent removal. To obtain the solution C, o-xylene (boiling point: about 144° C.) may be used instead of toluene. In this case, the amount of o-xylene to be added can be reduced to about one-fourth of the amount of toluene to be added, because the boiling point of o-xylene is higher than the boiling point of toluene.

When the light-absorbing composition further includes the second phosphonic acid, a solution H is additionally prepared for example, as follows. First, a copper salt such as copper acetate monohydrate is added to a given solvent such as tetrahydrofuran (THF), and the mixture is stirred to give a copper salt solution. To this copper salt solution is then added a phosphoric acid ester compound such as a phosphoric acid diester represented by the formula (c1) or a phosphoric acid monoester represented by the formula (c2), and the mixture is stirred to prepare a solution E. A solution F is also prepared by adding the second phosphonic acid to a given solvent such as THF and stirring the mixture. When a plurality of phosphonic acids are used as the second phosphonic acid, the solution F may be prepared by adding each phosphonic acid to a given solvent such as THF, stirring the mixture, and mixing a plurality of preliminary liquids each prepared to contain a different phosphonic acid. The solution F is added to the solution E while the solution E is stirred, and the mixture is further stirred for a given period of time. To the resultant solution is then added a given solvent such as toluene, and the mixture is stirred to obtain a solution G. Subsequently, the solution G is subjected to solvent removal under heating for a given period of time to obtain a solution H. This process removes the solvent such as THF and the component such as acetic acid generated by disassociation of the copper salt and yields another light absorber, which is formed by the second phosphonic acid and copper ion. The temperature at which the solution G is heated is determined as in the case of the solution C. The solvent for obtaining the solution G is also determined as in the case of the solution C.

The light-absorbing composition can be prepared by adding the matrix resin such as a silicone resin to the solution D and stirring the mixture. When the light-absorbing composition includes the light absorber formed by the second phosphonic acid and copper ion, the light-absorbing composition can be prepared by adding the matrix resin such as a silicone resin to the solution D, stirring the mixture to obtain a solution I, and further adding the solution H to the solution I and stirring the mixture.

The light-absorbing composition is applied to one principal surface of the transparent dielectric substrate 20 to form a film. For example, the light-absorbing composition in a liquid form is applied by spin coating or with a dispenser to one principal surface of the transparent dielectric substrate 20 to form a film. Next, this film is subjected to a given heat treatment to cure the film. For example, the film is exposed to an environment at a temperature of 50° C. to 200° C. The film is subjected to a humidification treatment, if necessary, to sufficiently hydrolyze the alkoxysilane monomer included in the light-absorbing composition. For example, the cured film is exposed to an environment at a temperature of 40° C. to 100° C. and a relative humidity of 40% to 100%. A repeating structure $(Si-O)_n$ of a siloxane bond is thus formed. The optical filter 1a can be produced in this manner. In common hydrolysis and polycondensation reactions of an alkoxysilane containing a monomer, both the alkoxysilane and water are in a liquid composition sometimes. However, if water is added beforehand to the light-absorbing composition to produce the optical filter, the phosphoric acid ester or light absorber is deteriorated in the course of the formation of the light-absorbing layer, and the light absorption performance can be decreased or the durability of the optical filter can be impaired. Therefore, the humidification treatment is desirably performed after the film is cured by the given heat treatment.

When the transparent dielectric substrate 20 is a glass substrate, a resin layer including a silane coupling agent may be formed between the transparent dielectric substrate 20 and light-absorbing layer 10 to improve the adhesion between the transparent dielectric substrate 20 and light-absorbing layer 10.

<Modifications>

The optical filter 1a can be modified in various respects. For example, the optical filter 1a may be modified to optical filters 1b to 1e shown in FIG. 1B to FIG. 1E. The optical filters 1b to 1e are configured in the same manner as the optical filter 1a, unless otherwise described. The components of the optical filters 1b to 1e that are the same as or correspond to those of the optical filter 1a are denoted by the same reference characters, and detailed descriptions of such components are omitted. The description given for the optical filter 1a can apply to the optical filters 1b to 1e, unless there is technical inconsistency.

Figure 1B:
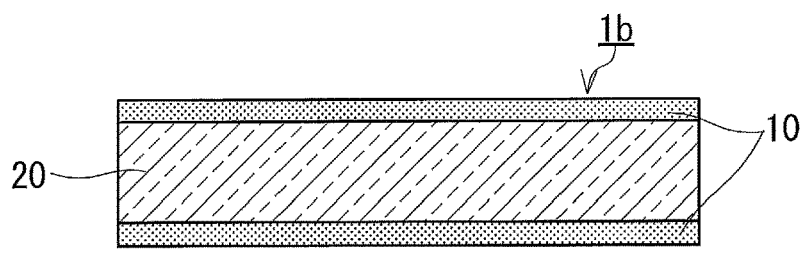
FIG. 1B is a cross-sectional view showing another example of the optical filter of the present invention.

As shown in FIG. 1B, the optical filter 1b according to another example of the present invention has the light-absorbing layers 10 formed on both principal surfaces of the transparent dielectric substrate 20. Therefore, the optical filter 1b can exhibit the optical characteristics (i) to (iii) owing to the two light-absorbing layers 10 rather than one light-absorbing layer 10. The light-absorbing layers 10 on both principal surfaces of the transparent dielectric substrate 20 may have the same or different thicknesses. That is, the formation of the light-absorbing layers on both principal surfaces of the transparent dielectric substrate 20 is done so that the two light-absorbing layers 10 account for equal or unequal proportions of the light-absorbing layer thickness required for the optical filter 1b to have desired optical properties. Thus, each of the light-absorbing layers 10 formed on both principal surfaces of the transparent dielectric substrate 20 of the optical filter 1b has a smaller thickness than the thickness of the light-absorbing layer 10 of the optical filter 1a. Thus, the internal pressure of the film is low and occurrence of a crack can be prevented. Additionally, it is possible to shorten the time spent on the application of the light-absorbing composition in a liquid form and shorten the time taken for the curing of the film of the light-absorbing composition applied. The formation of the light-absorbing layers 10 on both principal surfaces of the transparent dielectric substrate 20 can reduce warping of the optical filter 1b even when the transparent dielectric substrate 20 is thin. In this case as well, a resin layer including a silane coupling agent may be formed between the transparent dielectric substrate 20 and light-absorbing layer 10 to improve the adhesion between the transparent dielectric substrate 20 and light-absorbing layer 10.

Figure 1C:
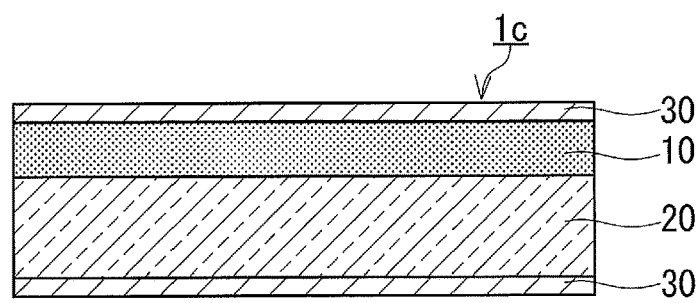
FIG. 1C is a cross-sectional view showing yet another example of the optical filter of the present invention.

As shown in FIG. 1C, the optical filter 1c according to another example of the present invention includes an anti-reflection film 30. The anti-reflection film is a film formed as an interface between the optical filter 1c and air and reducing reflection of visible light. The anti-reflection film 30 is, for example, a film formed of a dielectric made of, for example, a resin, an oxide, or a fluoride. The anti-reflection film 30 may be a multilayer film formed by laminating two or more types of dielectrics having different refractive indices. In particular, the anti-reflection film 30 may be a dielectric multilayer film made of a low-refractive-index material such as $SiO_2$ and a high-refractive-index material such as $TiO_2$ or $Ta_2O_5$. In this case, Fresnel reflection at the interface between the optical filter 1c and air is reduced and the amount of visible light passing through the optical filter 1c can be increased. In this case as well, a resin layer including a silane coupling agent may be formed between the transparent dielectric substrate and light-absorbing layer 10 to improve the adhesion between the transparent dielectric substrate 20 and light-absorbing layer 10. In some cases, a resin layer including a silane coupling agent may be formed between the light-absorbing layer and anti-reflection film 30 to improve the adhesion to the anti-reflection film 30. The anti-reflection film 30 may be disposed on each principal surface of the optical filter 1c, or may be disposed on one principal surface thereof.

Figure 1D:
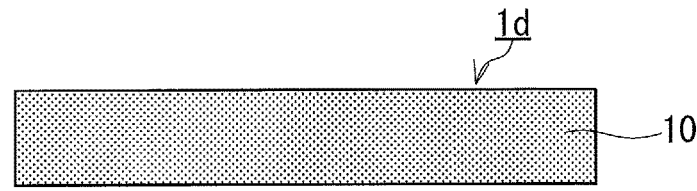
FIG. 1D is a cross-sectional view showing yet another example of the optical filter of the present invention.

As shown in FIG. 1D, the optical filter 1d according to another example of the present invention consists only of the light-absorbing layer 10. The optical filter 1d can be produced, for example, by applying the light-absorbing composition onto a given substrate such as a glass substrate, resin substrate, or metal substrate (such as a steel substrate or stainless steel substrate) to form a film, curing the film, and then separating the film from the substrate. The optical filter 1d may be produced by a melt molding method. Not including the transparent dielectric substrate 20, the optical filter 1d is thin. The optical filter 1d can thus contribute to achievement of imaging sensors and optical systems reduced in profile.

Figure 1E:
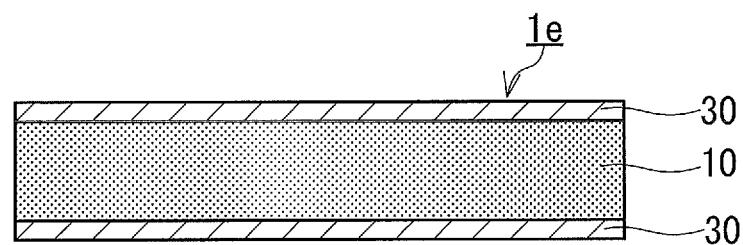
FIG. 1E is a cross-sectional view showing yet another example of the optical filter of the present invention.

As shown in FIG. 1E, the optical filter 1e according to another example of the present invention includes the light-absorbing layer 10 and a pair of the anti-reflection films 30 disposed on both sides of the light-absorbing layer 10. In this case, the optical filter 1e can contribute to achievement of imaging sensors and optical systems reduced in profile, and can increase the amount of visible light passing therethrough more than the optical filter 1d can.

The optical filters 1a to 1e may be modified to include an infrared-absorbing film or ultraviolet-absorbing film in addition to the light-absorbing layer 10 so as to increase their functionality. The infrared-absorbing film includes, for example, an organic infrared absorber, such as a cyanine-based, phthalocyanine-based, squarylium-based, diimmonium-based, or azo-based infrared absorber or an infrared absorber composed of a metal complex. The infrared-absorbing film includes, for example, one infrared absorber or two or more infrared absorbers selected from these infrared absorbers. The organic infrared absorber can absorb light in a relatively narrow wavelength range (absorption band) and is suitable for absorbing light with a wavelength in a given range.

The ultraviolet-absorbing film includes, for example, an ultraviolet absorber, such as a benzophenone-based, triazine-based, indole-based, merocyanine-based, or oxazole-based ultraviolet absorber. The ultraviolet-absorbing film, for example, includes one ultraviolet absorber or two or more ultraviolet absorbers selected from these ultraviolet absorbers. The ultraviolet absorber can include ultraviolet absorbers absorbing ultraviolet light with a wavelength, for example, around 300 nm to 340 nm, emitting light (fluorescence) with a wavelength longer than the absorbed wavelength, and functioning as a fluorescent agent or fluorescent brightener. The ultraviolet-absorbing film can reduce incidence of ultraviolet light which deteriorates the materials, such as resin, used in the optical filter.

The above infrared absorber or ultraviolet absorber may be contained beforehand in the transparent dielectric substrate 20 made of the resin. The infrared-absorbing film and ultraviolet-absorbing film each can be formed, for example, by forming a resin containing the infrared absorber or ultraviolet absorber into a film. In this case, it is necessary for the resin to allow the infrared absorber or ultraviolet absorber to be appropriately dissolved or dispersed therein and be transparent. Examples of such a resin include a (poly)olefin resin, polyimide resin, polyvinyl butyral resin, polycarbonate resin, polyamide resin, polysulfone resin, polyethersulfone resin, polyamideimide resin, (modified) acrylic resin, epoxy resin, and silicone resin.

The optical filters 1a to 1e are each disposed ahead (on the side closer to an object) of an imaging sensor, such as a CCD or CMOS, in an imaging apparatus in order to, for example, allow the spectral sensitivity of the imaging sensor in the imaging apparatus to approximate to the visual sensitivity of humans.

The optical filter 1a is used to produce, for example, a camera-equipped information device. In that case, the camera-equipped information device includes, for example, a lens system, an imaging sensor, and the optical filter 1a. The imaging sensor receives light having passed through the lens system. The optical filter 1a is disposed ahead of the lens system and protects the lens system. The optical filter 1a thus functions as a cover of the lens system.

Figure 2:
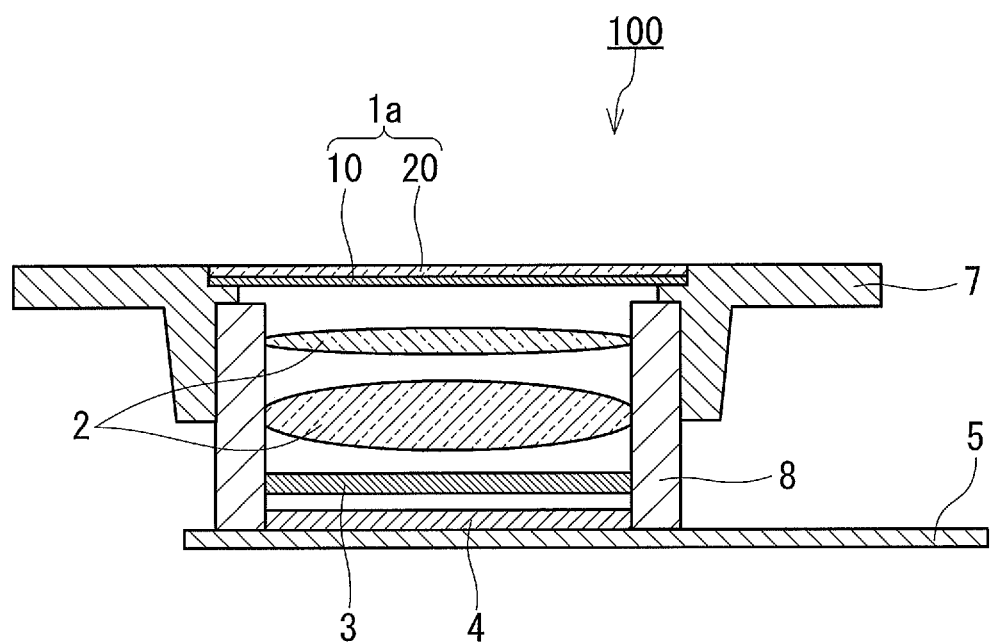
FIG. 2 is a cross-sectional view showing an example of a camera module including the optical filter of the present invention.

An example of a camera module 100 mounted in a camera-equipped information device will be given. As shown in FIG. 2, the camera module 100 includes, for example, a lens system 2, a low-pass filter 3, an imaging sensor 4, a circuit board 5, an optical filter support housing 7, and an optical system housing 8 in addition to the optical filter 1a. The rim of the optical filter 1a is, for example, fitted to a ring-shaped recessed portion adjacent to an opening formed in the middle of the optical filter support housing 7. The optical filter support housing 7 is fixed to the optical system housing 8. In the optical system housing 8, the lens system 2, low-pass filter 3, and imaging sensor 4 are disposed in this order along an optical axis. The imaging sensor 4 is, for example, a CCD or CMOS. After the ultraviolet and infrared portions of light coming from an object are cut by the optical filter 1a, the resultant light is focused by the lens system 2 and then goes through the low-pass filter 3 to enter the imaging sensor 4. An electrical signal generated by the imaging sensor 4 is sent outside the camera module 100 by the circuit board 5.

In the camera module 100, the optical filter 1a functions also as a cover (protective filter) that protects the lens system 2. In this case, a sapphire substrate is desirably used as the transparent dielectric substrate 20 of the optical filter 1a. Having high scratch-resistance, a sapphire substrate is desirably disposed, for example, on the external side (the side opposite to the imaging sensor 4). The optical filter 1a consequently exhibits high scratch-resistance, for example, on external contact and has the optical characteristics (i) to (iii) (and desirably further has the optical characteristics (iv) to (xiii)). This eliminates the need to dispose an optical filter for cutting off infrared light or ultraviolet light near the imaging sensor 4 and facilitates a reduction of the camera module 100 in profile. It should be noted that FIG. 2 showing the camera module 100 is a schematic diagram illustrating an example of, for example, the disposition of the parts, and describes an embodiment where the optical filter 1a is used as a protective filter. As long as the optical filter 1a functions as a protective filter, the camera module employing the optical filter 1a is not limited to the one shown in FIG. 2. If necessary, the low-pass filter 3 may be omitted or another filter may be included. Furthermore, an anti-reflection film may be formed in contact with the light-absorbing layer 10 of the optical filter 1a.

EXAMPLES

The present invention will be described in more detail by examples. The present invention is not limited to the examples given below. First, methods for evaluation of optical filters according to Examples and Comparative Examples will be described.

<Measurement of Transmittance Spectra of Optical Filter>

Transmittance spectra shown upon incidence of light with wavelengths of 300 nm to 1200 nm on the optical filters according to Examples and Comparative Examples were measured using an ultraviolet-visible spectrophotometer (manufactured by JASCO Corporation, product name: V-670). The incident angle of the light incident on the optical filters was changed from 0° to 65° at 5o intervals to measure a transmittance spectrum at each angle.

<Measurement of Thickness of Light-Absorbing Layer>

The thicknesses of the optical filters according to Examples and Comparative Examples were measured with a digital micrometer. For each optical filter according to Example or Comparative Example having a transparent dielectric substrate made of, for example, glass, the thickness of the light-absorbing layer of the optical film was determined by subtracting the thickness of the transparent glass substrate from the thickness of the optical filter measured with a digital micrometer.

Example 1

1.125 g of copper acetate monohydrate $((CH_3COO)_2Cu \cdot H_2O)$ and 60 g of tetrahydrofuran (THF) were mixed, and the mixture was stirred for 3 hours to obtain a copper acetate solution. To the obtained copper acetate solution was then added 0.412 g of PLYSURF A208N (manufactured by DKS Co., Ltd.) which is a phosphoric acid ester compound, and the mixture was stirred for 30 minutes to obtain a solution A. 10 g of THF was added to 0.441 g of phenylphosphonic acid $(C_6H_5PO(OH)_2)$ (manufactured by Nissan Chemical Industries, Ltd.), and the mixture was stirred for 30 minutes to obtain a solution B-1. 10 g of THF was added to 0.661 g of 4-bromophenylphosphonic acid ($C_6H_4BrPO(OH)_2$) (manufactured by Tokyo Chemical Industry Co., Ltd.), and the mixture was stirred for 30 minutes to obtain a solution B-2. Next, the solutions B-1 and B-2 were mixed, and the mixture was stirred for 1 minute. 1.934 g of methyltriethoxysilane (MTES: $CH_3Si(OC_2H_5)_3$) (manufactured by Shin-Etsu Chemical Co., Ltd.) and 0.634 g of tetraethoxysilane (TEOS: $Si(OC_2H_5)_4$) (manufactured by KISHIDA CHEMICAL Co., Ltd., special grade) were added, and the mixture was further stirred for 1 minute to obtain a solution B. The solution B was added to the solution A while the solution A was stirred, and the mixture was stirred at room temperature for 1 minute. To the resultant solution was then added 25 g of toluene, and the mixture was stirred at room temperature for 1 minute to obtain a solution C. This solution C was placed in a flask and subjected to solvent removal using a rotary evaporator (manufactured by Tokyo Rikakikai Co., Ltd., product code: N-1110SF) under heating by means of an oil bath (manufactured by Tokyo Rikakikai Co., Ltd., product code: OSB-2100). The temperature of the oil bath was controlled to 105° C. A solution D which had been subjected to the solvent removal was then collected from the flask. The solution D which is a dispersion of fine particles of copper phenyl-based phosphonate (absorber) including copper phenylphosphonate and copper 4-bromophenylphosphonate was transparent, and the fine particles were well dispersed therein.

0.225 g of copper acetate monohydrate and 36 g of THF were mixed, and the mixture was stirred for 3 hours to obtain a copper acetate solution. To the obtained copper acetate solution was then added 0.129 g of PLYSURF A208N which is a phosphoric acid ester compound, and the mixture was stirred for 30 minutes to obtain a solution E. 10 g of THF was added to 0.144 g of n-butylphosphonic acid ($C_4H_9PO(OH)_2$) (manufactured by Nippon Chemical Industrial Co., Ltd.), and the mixture was stirred for 30 minutes to obtain a solution F. The solution F was added to the solution E while the solution E was stirred, and the mixture was stirred at room temperature for 1 minute. To the resultant solution was then added 25 g of toluene, and the mixture was stirred at room temperature for 1 minute to obtain a solution G. This solution G was placed in a flask and subjected to solvent removal using a rotary evaporator under heating by means of an oil bath. The temperature of the oil bath was controlled to 105° C. A solution H which had been subjected to the solvent removal was then collected from the flask. The solution H which is a dispersion of fine particles of copper butylphosphonate was transparent, and the fine particles were well dispersed therein.

To the solution D was added 2.200 g of a silicone resin (manufactured by Shin-Etsu Chemical Co., Ltd., product name: KR-300), and the mixture was stirred for 30 minutes to obtain a solution I. The solution H was added to the solution I, and the mixture was stirred for 30 minutes to obtain a light-absorbing composition (solution J) according to Example 1. For the light-absorbing composition (solution J) according to Example 1, the contents of the components are shown in Table 1 on a mass basis, and the contents of the components and the percentage contents of the phosphonic acids are shown in Table 2 on an amount-of-substance basis. The percentage content of each phosphonic acid is determined by rounding a value to one decimal place, and thus the sum of the percentage contents may not always be 100 mol %.

Figure 3:
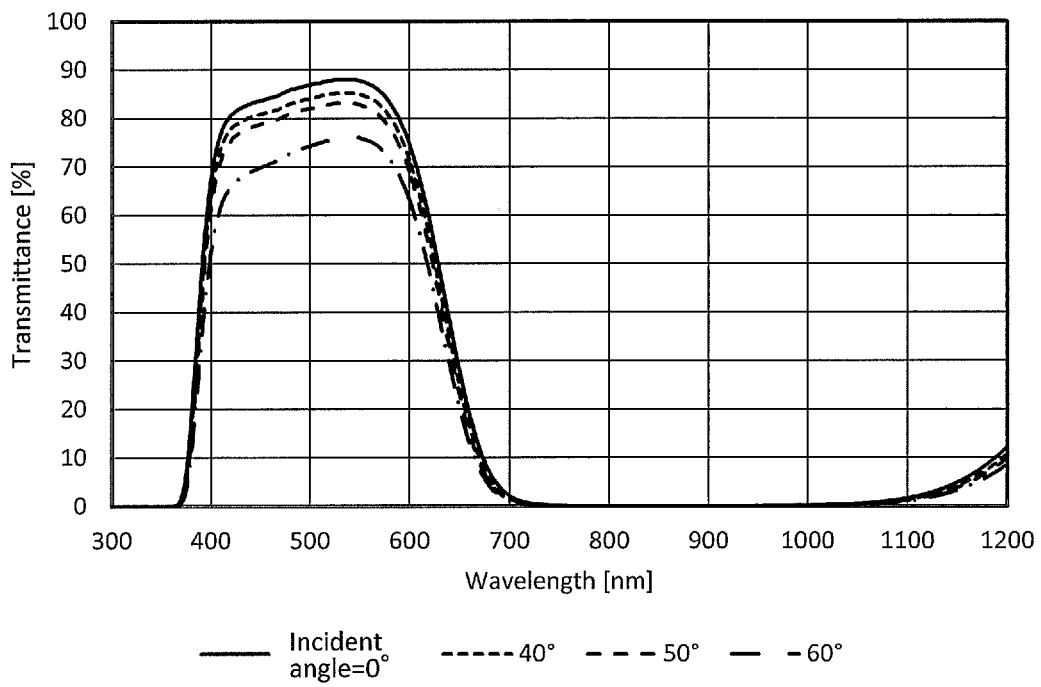
FIG. 3 shows transmittance spectra of an optical filter according to Example 1.

The light-absorbing composition according to Example 1 was applied with a dispenser to a 30 mm×30 mm central region of one principal surface of a transparent glass substrate (manufactured by SCHOTT AG, product name: D 263) made of borosilicate glass and having dimensions of 76 mm×76 mm×0.21 mm. A film was thus formed on the substrate. The thickness of the film was determined through trial and error so that the optical filter would have an average transmittance of about 1% in the wavelength range of 700 to 730 nm. When the light-absorbing composition was applied to the transparent glass substrate, a frame having an opening corresponding in dimensions to the region where the film-forming liquid was applied was put on the transparent glass substrate to hold back the film-forming liquid and prevent the film-forming liquid from spreading. The amount of the film-forming liquid applied was adjusted, so that the film obtained had a desired thickness. Subsequently, the transparent glass substrate with the undried film was placed in an oven and heat-treated at 85° C. for 6 hours to cure the film. After that, the transparent glass substrate with the film formed thereon was placed in a thermo-hygrostat set at a temperature of 85° C. and a relative humidity of 85% for a 20-hour humidification treatment. An optical filter according to Example 1 including a light-absorbing layer formed on a transparent glass substrate was thus obtained. The humidification treatment was performed to promote hydrolysis and polycondensation of the alkoxysilanes contained in the light-absorbing composition applied onto the transparent glass substrate and form a hard and dense matrix of the light-absorbing layer. The thickness of the light-absorbing layer of the optical filter according to Example 1 was 170 μm. Transmittance spectra shown by the optical filter according to Example 1 at incident angles ranging from 0° to 65° were measured. The transmittance spectra shown thereby at incident angles of 0°, 40°, 50°, and 60° are shown in FIG. 3. The results of observing the transmittance spectrum shown by the optical filter according to Example 1 at an incident angle of 0° are shown in Tables 7 and 8. "Wavelength range in which transmittance is 78% or more" in Table 8 refers to a wavelength range which is in the wavelength range of 400 nm to 600 nm and in which the spectral transmittance is 78% or more. "Wavelength range in which transmittance is 1% or less" as to the infrared region properties in Table 8 refers to a wavelength range which is in the wavelength range of 700 nm to 1200 nm and in which the spectral transmittance is 1% or less. "Wavelength range in which transmittance is 0.1% or less" as to the infrared region properties in Table 8 refers to a wavelength range which is in the wavelength range of 700 nm to 1200 nm and in which the spectral transmittance is 0.1% or less. "Wavelength range in which transmittance is 1% or less" as to the ultraviolet region properties in Table 8 refers to a wavelength range which is in the wavelength range of 300 nm to 400 nm and in which the spectral transmittance is 1% or less. "Wavelength range in which transmittance is 0.1% or less" as to the ultraviolet region properties in Table 8 refers to a wavelength range which is in the wavelength range of 300 nm to 400 nm and in which the spectral transmittance is 0.1% or less. The same can be said in Tables 10, 12, 14, 16, 18, and 20. Moreover, the results (incident angles: 0° to 65°) of observing the transmittance spectra shown by the optical filter according to Example 1 at incident angles of 0° and 30° to 65° (at 50 intervals) are shown in Tables 11 and 12.

Examples 2 to 15

Figure 4:
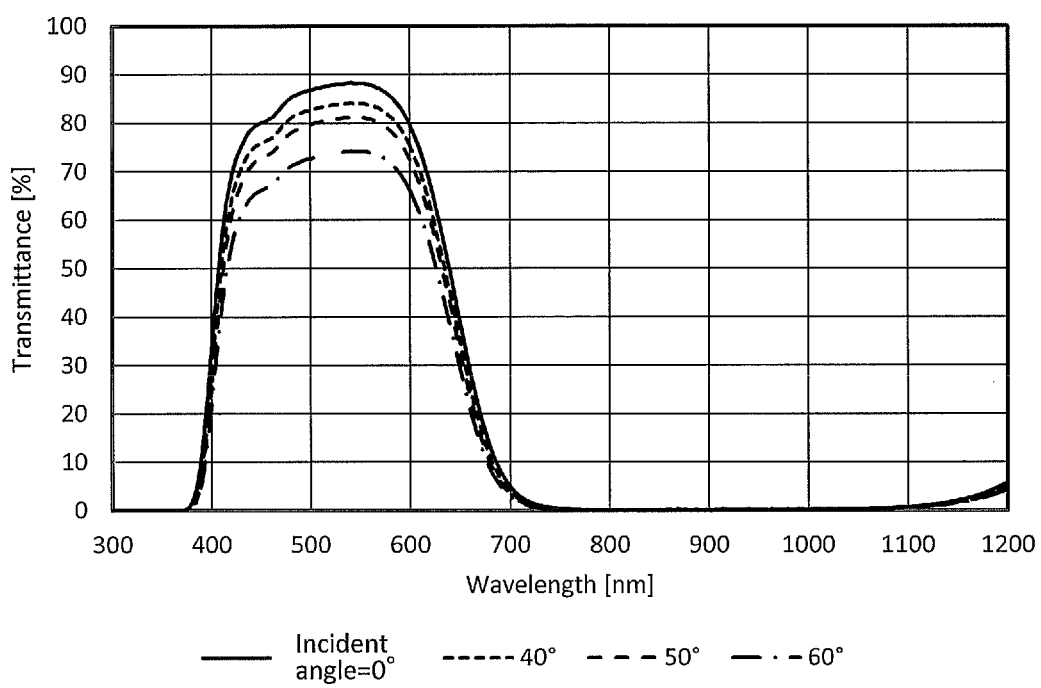
FIG. 4 shows transmittance spectra of an optical filter according to Example 2.

Light-absorbing compositions according to Examples 2 to 15 were prepared in the same manner as in Example 1, except that the amounts of the compounds added were adjusted as shown in Table 1. Optical filters according to Examples 2 to 15 were produced in the same manner as in Example 1, except that the light-absorbing compositions according to Examples 2 to 15 were used instead of the light-absorbing composition according to Example 1 and that the thicknesses of the light-absorbing layers were adjusted as shown in Table 1. The contents and percentage contents of the phosphonic acids are shown in Table 2 on an amount-of-substance basis. The percentage content of each phosphonic acid is determined by rounding a value to one decimal place, and thus the sum of the percentage contents may not always be 100 mol %. Transmittance spectra shown by the optical filter according to Example 2 at incident angles ranging from 0° to 65° were measured. The transmittance spectra shown thereby at incident angles of 0°, 40°, 50°, and 60° are shown in FIG. 4. The results of observing the transmittance spectrum shown by the optical filter according to Example 2 at an incident angle of 0° are shown in Tables 7 and 8. Moreover, the results of observing the transmittance spectra shown by the optical filter according to Example 2 at incident angles of 0° and 30° to 65° (at 50 intervals) are shown in Tables 13 and 14. Additionally, the results of observing the transmittance spectra shown by the optical filters according to Examples 3 to 15 at an incident angle of 0° are shown in Tables 7 and 8.

Example 16

Figure 5:
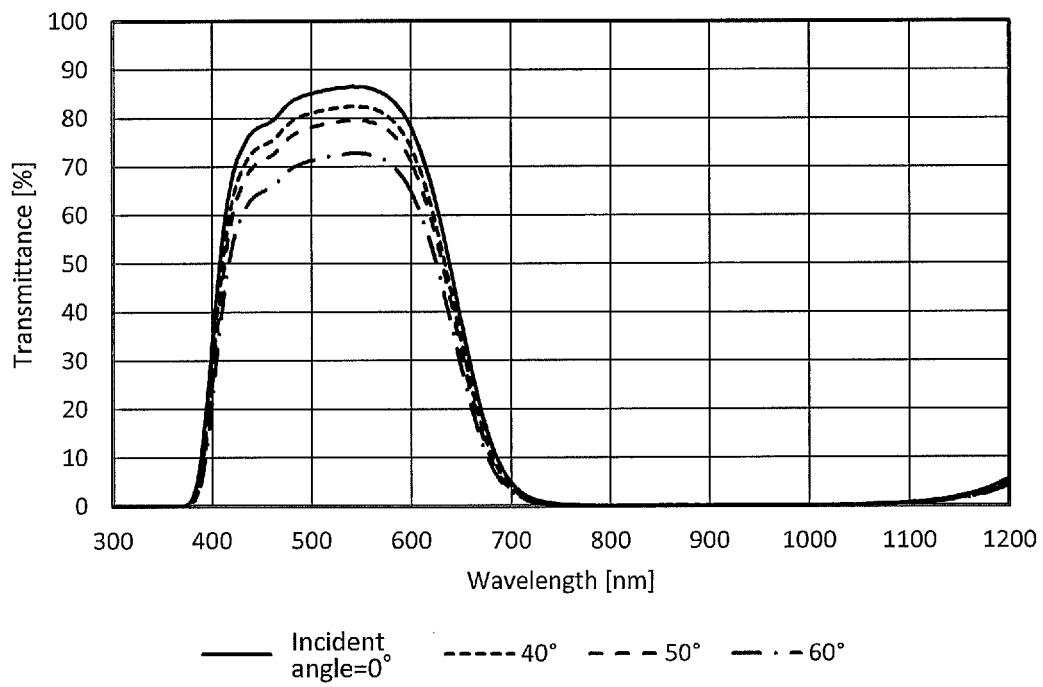
FIG. 5 shows transmittance spectra of an optical filter according to Example 16.

The light-absorbing composition according to Example 2 was applied with a dispenser to a 30 mm×30 mm central region of one principal surface of a transparent glass substrate (manufactured by SCHOTT AG, product name: D 263) made of borosilicate glass and having dimensions of 76 mm×76 mm×0.21 mm. A film having a given thickness was thus formed on the substrate. When the light-absorbing composition was applied to the transparent glass substrate, a frame having an opening corresponding in dimensions to the region where the film-forming liquid was applied was put on the transparent glass substrate to hold back the film-forming liquid and prevent the film-forming liquid from spreading. Next, the transparent glass substrate with the undried film was placed in an oven and heat-treated at 85° C. for 6 hours to cure the film. After that, the film was separated from the transparent glass substrate. The separated film was placed in a thermo-hygrostat set at a temperature of 85° C. and a relative humidity of 85% for a 20-hour humidification treatment. An optical filter according to Example 16 consisting only of a light-absorbing layer was thus obtained. The thickness of the light-absorbing layer alone was measured with a digital micrometer. The thickness of the optical filter according to Example 16 turned out to be 132 μm. Transmittance spectra shown by the optical filter according to Example 16 at incident angles ranging from 0° to 65° were measured. The transmittance spectra shown thereby at incident angles of 0°, 40°, 50°, and 60° are shown in FIG. 5. The results of observing the transmittance spectrum shown by the optical filter according to Example 16 at an incident angle of 0° are shown in Tables 7 and 8. Moreover, the results of observing the transmittance spectra shown by the optical filter according to Example 16 at incident angles of 0° and 30° to 65° (at 50 intervals) are shown in Tables 15 and 16.

Example 17

Figure 6:
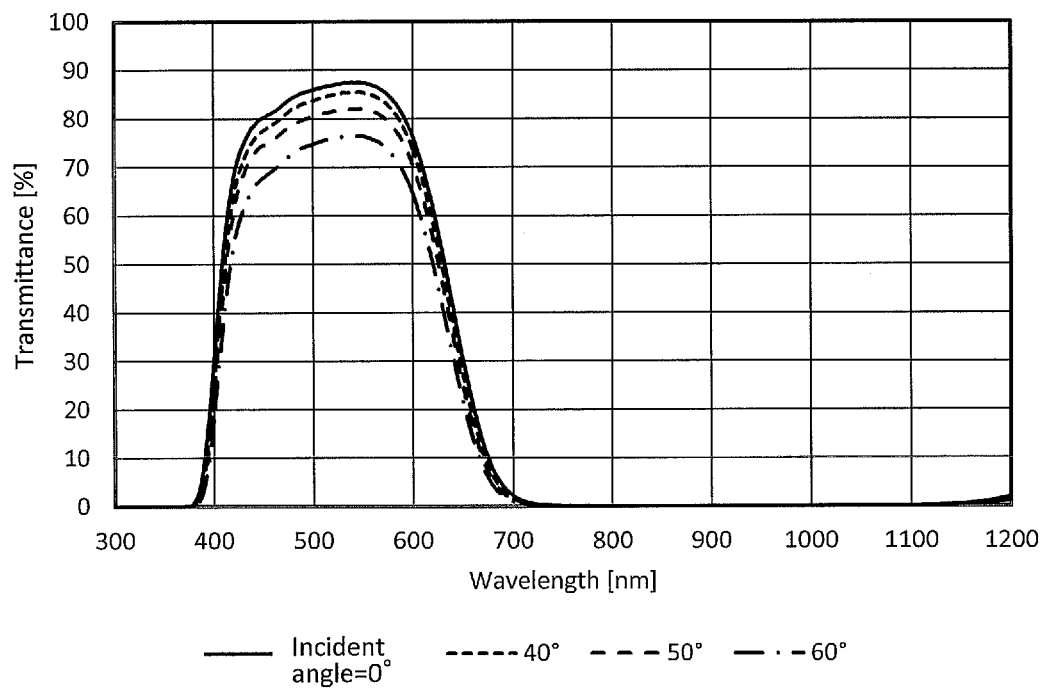
FIG. 6 shows transmittance spectra of an optical filter according to Example 17.
Figure 7:
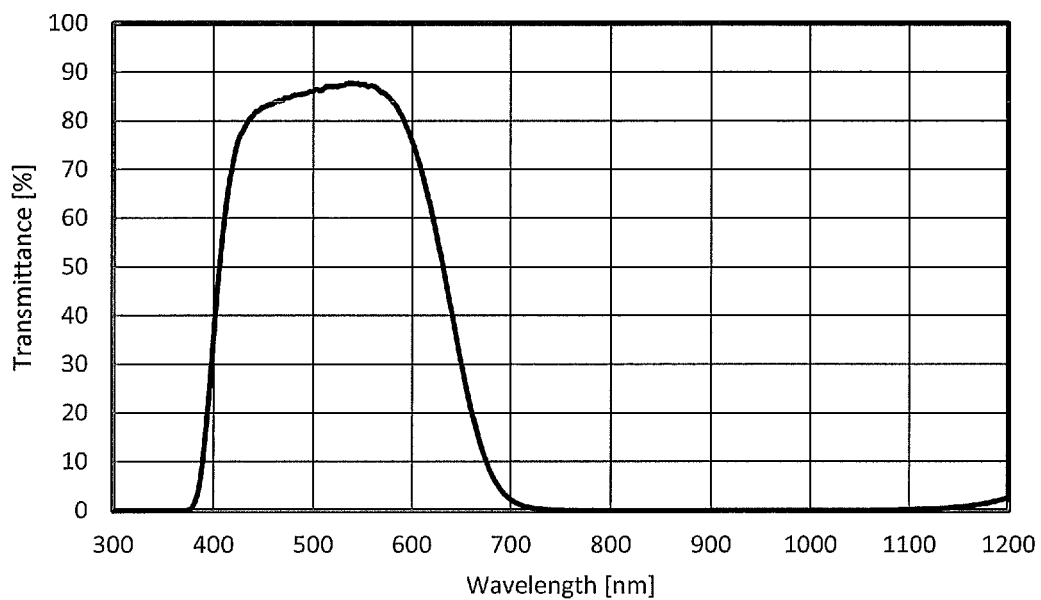
FIG. 7 shows a transmittance spectrum of an optical filter according to Example 20.
Figure 8:
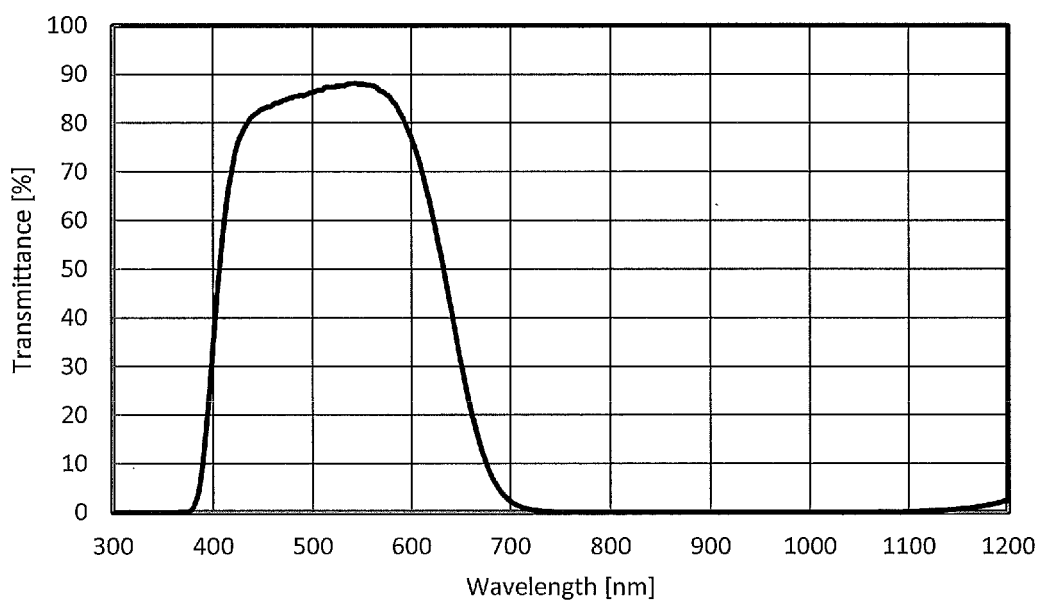
FIG. 8 shows a transmittance spectrum of an optical filter according to Example 21.
Figure 9:
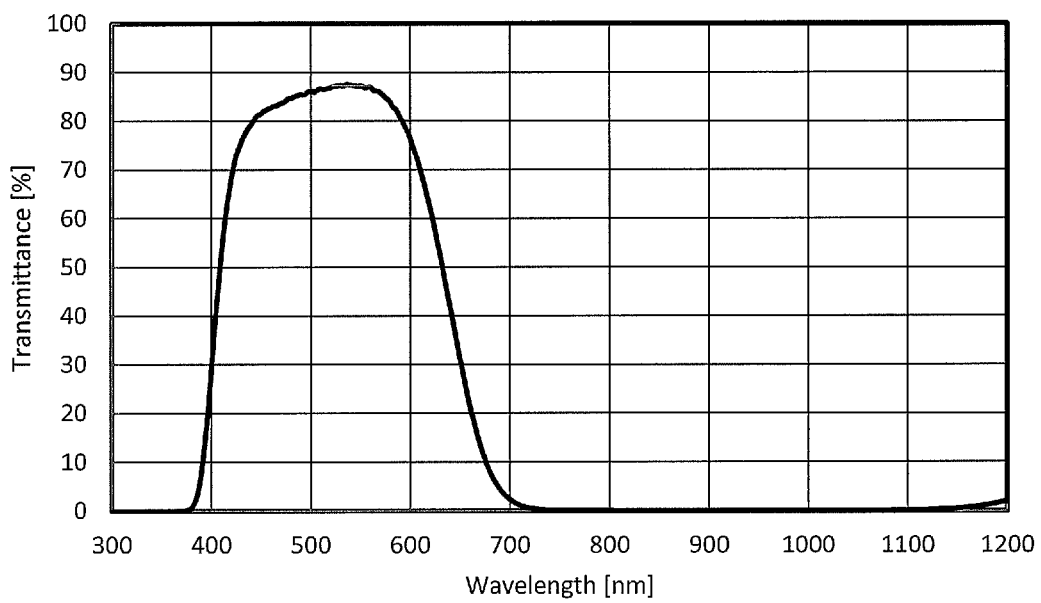
FIG. 9 shows a transmittance spectrum of an optical filter according to Example 22.

The light-absorbing composition according to Example 2 was applied with a dispenser to a 30 mm×30 mm central region of one principal surface of a transparent glass substrate (manufactured by SCHOTT AG, product name: D 263) made of borosilicate glass and having dimensions of 76 mm×76 mm×0.21 mm. A film having a smaller thickness than that of the film in Example 2 was thus formed on the substrate. When the light-absorbing composition was applied to the transparent glass substrate, a frame having an opening corresponding in dimensions to the region where the film-forming liquid was applied was put on the transparent glass substrate to hold back the film-forming liquid and prevent the film-forming liquid from spreading. Next, the transparent glass substrate with the undried film was placed in an oven and heat-treated at 85° C. for 6 hours to cure the film. Subsequently, the light-absorbing composition according to Example 2 was applied with a dispenser to a 30 mm×30 mm central region of the other principal surface of the transparent glass substrate. A film having a smaller thickness than that of the film in Example 2 was thus formed on the substrate. When the light-absorbing composition was applied to the transparent glass substrate, a frame having an opening corresponding in dimensions to the region where the film-forming liquid was applied was put on the transparent glass substrate to hold back the film-forming liquid and prevent the film-forming liquid from spreading. Next, the transparent glass substrate with the undried film was placed in an oven and heat-treated at 85° C. for 6 hours to cure the film. Then, the transparent glass substrate with the above films formed on both principal surfaces thereof was placed in a thermo-hygrostat set at a temperature of 85° C. and a relative humidity of 85% for a 20-hour humidification treatment. An optical filter according to Example 17 in which light-absorbing layers were formed on both sides of a transparent glass substrate was thus obtained. The sum of the thicknesses of the light-absorbing layers formed on both sides of the transparent glass substrate was 193 μm. Transmittance spectra shown by the optical filter according to Example 17 at incident angles ranging from 0° to 65° were measured. The transmittance spectra shown thereby at incident angles of 0°, 40°, 50°, and 60° are shown in FIG. 6. The results of observing the transmittance spectrum shown by the optical filter according to Example 17 at an incident angle of 0° are shown in Tables 7 and 8. Moreover, the results of observing the transmittance spectra shown by the optical filter according to Example 17 at incident angles of 0° and 30° to 65° (at 50 intervals) are shown in Tables 17 and 18.

Example 18

A light-absorbing composition according to Example 18 was prepared in the same manner as in Example 1, except that PLYSURF A208F (manufactured by DKS Co., Ltd.) was used as a phosphoric acid ester compound instead of PLYSURF A208N and that the amounts of the compounds added were adjusted as shown in Table 1. An optical filter according to Example 18 was produced in the same manner as in Example 1, except that the light-absorbing composition according to Example 18 was used instead of the light-absorbing composition according to Example 1 and that the thickness of the light-absorbing layer was adjusted to 198 μm. Transmittance spectra shown by the optical filter according to Example 18 at incident angles ranging from 0° to 65° were measured, and the results of observing the transmittance spectrum shown thereby at an incident angle of 0° are shown in Tables 7 and 8. The results of observing the transmittance spectra shown by the optical filter according to Example 18 at incident angles of 0° and 30° to 65° (at 5° intervals) are shown in Tables 19 and 20.

Example 19

A light-absorbing composition according to Example 19 was prepared in the same manner as in Example 1, except that 4-fluorophenylphosphonic acid ($C_6H_4FPO(OH)_2$) (manufactured by Tokyo Chemical Industry Co., Ltd.) was used instead of 4-bromophenylphosphonic acid and that the amounts of the compounds added were adjusted as shown in Table 1. An optical filter according to Example was produced in the same manner as in Example 1, except that the light-absorbing composition according to Example 19 was used instead of the light-absorbing composition according to Example 1 and that the thickness of the light-absorbing layer was adjusted to 168 µm. Transmittance spectra shown by the optical filter according to Example 19 were measured, and the results of observing the transmittance spectrum shown thereby at an incident angle of 0° are shown in Tables 7 and 8.

Examples 20 to 35

Optical filters according to Examples 20 to 35 were each produced in the same manner as in Example 2, except that the conditions of the humidification treatment of the dried film were changed as shown in Table 3 and that the thickness of the light-absorbing layer was adjusted as shown in Table 3. Transmittance spectra shown by the optical filters according to Examples 20 to 35 were measured. The transmittance spectra shown by the optical filters according to Examples 20 to 22 at an incident angle of 0° are shown in Tables 7 to 9, respectively. The results of observing the transmittance spectra shown by the optical filters according to Examples 20 to 35 at an incident angle of 0° are shown in Tables 7 and 8.

Example 36

Figure 10:
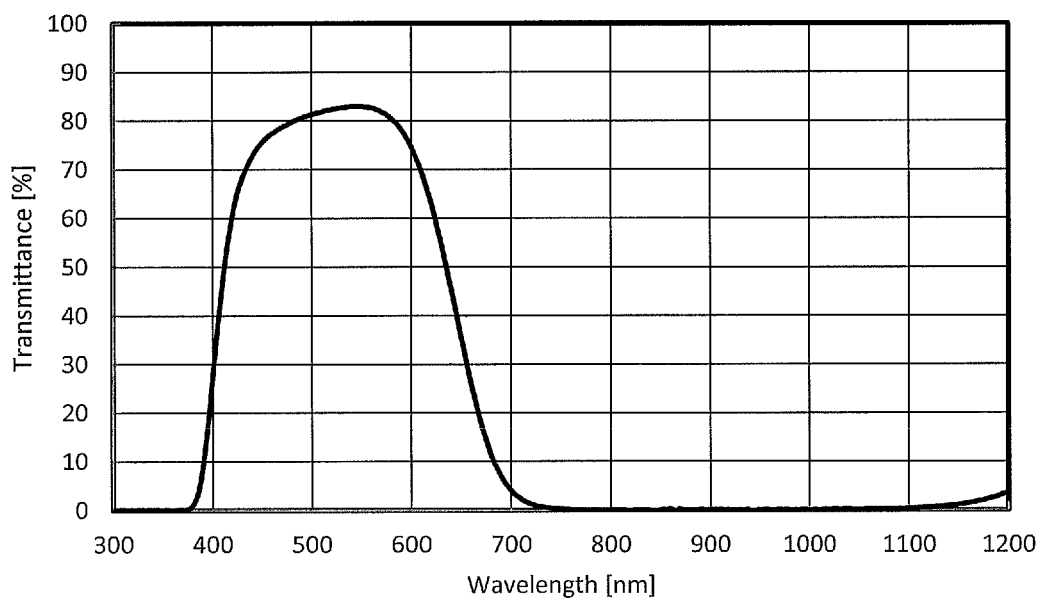
FIG. 10 shows a transmittance spectrum of an optical filter according to Example 36.

An optical filter according to Example 36 was produced in the same manner as in Example 2, except that a 0.3-mm-thick sapphire substrate was used instead of the transparent glass substrate as used in Example 2 and that the thickness of the light-absorbing layer was adjusted to 168 µm. Transmittance spectra shown by the optical filter according to Examples 36 were measured. The transmittance spectrum shown by the optical filter according to Example 36 at an incident angle of 0° is shown in FIG. 10. The results of observing the transmittance spectrum shown thereby at an incident angle of 0° are shown in Tables 7 and 8.

Comparative Example 1

A solution D (dispersion of fine particles of copper phenyl-based phosphonate) according to Comparative Example 1 was prepared in the same manner as in Example 1, except that the amounts of the compounds added were adjusted as shown in Tables 4 and 5. To the solution D according to Comparative Example 1 was added 2.200 g of a silicone resin (manufactured by Shin-Etsu Chemical Co., Ltd., product name: KR-300), and the mixture was stirred for 30 minutes to obtain a light-absorbing composition according to Comparative Example 1. An optical filter according to Comparative Example 1 was produced in the same manner as in Example 1, except that the light-absorbing composition according to Comparative Example 1 was used instead of the light-absorbing composition according to Example 1 and that the thickness of the light-absorbing layer was adjusted to 126 µm. Transmittance spectra shown by the optical filter according to Comparative Example 1 were measured. The results of observing the transmittance spectrum shown by the optical filter according to Comparative Example 1 at an incident angle of 0° are shown in Tables 9 and 10. Moreover, based on the results of the measurement of the transmittance spectrum shown by the optical filter according to Comparative Example 1 at an incident angle of 0°, a transmittance spectrum was calculated on the assumption that the thickness of the light-absorbing layer of the optical filter according to Comparative Example 1 was changed to 200 µm. The results of observing this transmittance spectrum are shown in Tables 9 and 10 as Comparative Calculation Example 1.

Comparative Example 2

A solution D (dispersion of fine particles of copper phenyl-based phosphonate) according to Comparative Example 2 was prepared in the same manner as in Example 1, except that the amounts of the compounds added were adjusted as shown in Tables 4 and 5. To the solution D according to Comparative Example 2 was added 4.400 g of a silicone resin (manufactured by Shin-Etsu Chemical Co., Ltd., product name: KR-300), and the mixture was stirred for 30 minutes to obtain a light-absorbing composition according to Comparative Example 2. An optical filter according to Comparative Example 2 was produced in the same manner as in Example 1, except that the light-absorbing composition according to Comparative Example 2 was used instead of the light-absorbing composition according to Example 1, that the thickness of the light-absorbing layer was adjusted to 217 µm, and that the conditions of the heat treatment for curing the film and conditions of the humidification treatment were changed as shown in Table 6. Transmittance spectra shown by the optical filter according to Comparative Example 2 were measured. The results of observing the transmittance spectrum shown by the optical filter according to Comparative Example 2 at an incident angle of 0° are shown in Tables 9 and 10. Moreover, based on the results of the measurement of the transmittance spectrum shown by the optical filter according to Comparative Example 2 at an incident angle of 0°, a transmittance spectrum was calculated on the assumption that the thickness of the light-absorbing layer of the optical filter according to Comparative Example 2 was changed to 347 µm. The results of observing this transmittance spectrum are shown in Tables 9 and 10 as Comparative Calculation Example 2.

Comparative Example 3

1.125 g of copper acetate monohydrate and 60 g of THF were mixed, and the mixture was stirred for 3 hours to obtain a copper acetate solution. To the obtained copper acetate solution was then added 0.624 g of PLYSURF A208F (manufactured by DKS Co., Ltd.), and the mixture was stirred for 30 minutes to obtain a solution A. 10 g of THF was added to 0.832 g of phenylphosphonic acid (manufactured by Nissan Chemical Industries, Ltd.), and the mixture was stirred for 30 minutes to obtain a solution B-1. 1.274 g of MTES (manufactured by Shin-Etsu Chemical Co., Ltd.) and 1.012 g of TEOS (manufactured by KISHIDA CHEMICAL Co., Ltd., special grade) were added to the solution B-1, and the mixture was further stirred for 1 minute to obtain a solution B. The solution B was added to the solution A while the solution A was stirred, and the mixture was stirred at room temperature for 1 minute. To the resultant solution was then added 25 g of toluene, and the mixture was stirred at room temperature for 1 minute to obtain a solution C. This solution C was placed in a flask and subjected to solvent removal using a rotary evaporator (manufactured by Tokyo Rikakikai Co., Ltd., product code: N-1110SF) under heating by means of an oil bath (manufactured by Tokyo Rikakikai Co., Ltd., product code: OSB-2100). The temperature of the oil bath was controlled to 105° C. A solution D according to Comparative Example 3 which had been subjected to the solvent removal was then collected from the flask. The solution D (dispersion of fine particles of copper phenylphosphonate) according to Comparative Example 3 was transparent, and the fine particles were well dispersed therein.

To the solution D according to Comparative Example 3 was added 4.400 g of a silicone resin (manufactured by Shin-Etsu Chemical Co., Ltd., product name: KR-300), and the mixture was stirred for 30 minutes to obtain a light-absorbing composition according to Comparative Example 3. An optical filter according to Comparative Example 3 was produced in the same manner as in Example 1, except that the light-absorbing composition according to Comparative Example 3 was used instead of the light-absorbing composition according to Example 1, that the thickness of the light-absorbing layer was adjusted to 198 µm, and that the conditions of the heat treatment for curing the film were changed as shown in Table 6. Transmittance spectra shown by the optical filter according to Comparative Example 3 were measured. The results of observing the transmittance spectrum shown by the optical filter according to Comparative Example 3 at an incident angle of 0° are shown in Tables 9 and 10. Moreover, based on the results of the measurement of the transmittance spectrum shown by the optical filter according to Comparative Example 3 at an incident angle of 0°, a transmittance spectrum was calculated on the assumption that the thickness of the light-absorbing layer of the optical filter according to Comparative Example 3 was changed to 303 µm. The results of observing this transmittance spectrum are shown in Tables 9 and 10 as Comparative Calculation Example 3.

Comparative Example 4

An optical filter according to Comparative Example 4 was produced in the same manner as in Example 2, except that the thickness of the light-absorbing layer was adjusted to 191 µm and that the humidification treatment of the film was not performed. Transmittance spectra shown by the optical filter according to Comparative Example 4 were measured. The results of observing the transmittance spectrum shown by the optical filter according to Comparative Example 4 at an incident angle of 0° are shown in Tables 9 and 10. Moreover, based on the transmittance spectrum shown by the optical filter according to Comparative Example 4 at an incident angle of 0°, a transmittance spectrum was calculated on the assumption that the thickness of the light-absorbing layer of the optical filter according to Comparative Example 4 was changed to 148 µm. The results of observing this transmittance spectrum are shown in Tables 9 and 10 as Comparative Calculation Example 4.

Comparative Examples 5 and 6

Optical filters according to Comparative Examples 5 and 6 were each produced in the same manner as in Example 2, except that the thickness of the light-absorbing layer was adjusted as shown in Table 9 and that the humidification treatment of the film was adjusted as shown in Table 6. Transmittance spectra shown by the optical filters according to Comparative Examples 5 and 6 were measured. The results of observing the transmittance spectrum shown by the optical filter according to Comparative Example 5 at an incident angle of 0° are shown in Tables 9 and 10. Moreover, based on the transmittance spectrum shown by the optical filter according to Comparative Example 5 at an incident angle of 0°, a transmittance spectrum was calculated on the assumption that the thickness of the light-absorbing layer of the optical filter according to Comparative Example 5 was changed to 155 µm. The results of observing this transmittance spectrum are shown in Tables 9 and 10 as Comparative Calculation Example 6. Additionally, the results of observing the transmittance spectrum shown by the optical filter according to Comparative Example 6 at an incident angle of 0° are shown in Tables 9 and 10. Moreover, based on the transmittance spectrum shown by the optical filter according to Comparative Example 6 at an incident angle of 0°, a transmittance spectrum was calculated on the assumption that the thickness of the light-absorbing layer of the optical filter according to Comparative Example 6 was changed to 161 µm. The results of observing this transmittance spectrum are shown in Tables 9 and 10 as Comparative Calculation Example 6.

Comparative Example 7

A solution D (dispersion of fine particles of copper phenyl-based phosphonate) according to Comparative Example 7 was prepared in the same manner as in Comparative Example 1. 0.225 g of copper acetate monohydrate and 36 g of THF were mixed, and the mixture was stirred for 3 hours to obtain a copper acetate solution. To the obtained copper acetate solution was then added 0.178 g of PLY-SURF A208F (manufactured by DKS Co., Ltd.) which is a phosphoric acid ester compound, and the mixture was stirred for 30 minutes to obtain a solution E. 10 g of THF was added to 0.134 g of n-butylphosphonic acid (manufactured by Nippon Chemical Industrial Co., Ltd.), and the mixture was stirred for 30 minutes to obtain a solution F. The solution F was added to the solution E while the solution E was stirred, and the mixture was stirred at room temperature for 1 minute. To the resultant solution was then added 25 g of toluene, and the mixture was stirred at room temperature for 1 minute to obtain a solution G. This solution G was placed in a flask and subjected to solvent removal using a rotary evaporator under heating by means of an oil bath. The temperature of the oil bath was controlled to 105° C. A solution H according to Comparative Example 7 which had been subjected to the solvent removal was then collected from the flask. To the solution D according to Comparative Example 7 was added 2.200 g of a silicone resin (manufactured by Shin-Etsu Chemical Co., Ltd., product name: KR-300), and the mixture was stirred for 30 minutes to obtain a solution I according to Comparative Example 7. The solution H according to Comparative Example 7 was added to the solution I according to Comparative Example 7, and the mixture was stirred. Aggregation of copper phosphonate particles occurred and a light-absorbing composition having a high transparency could not be obtained.

Comparative Example 8

An attempt to prepare a light-absorbing composition containing n-butylphosphonic acid, as the only phosphonic acid, in an amount shown in Table 4 and no alkoxysilane monomer resulted in aggregation of copper phosphonate particles, and a homogeneous light-absorbing composition having a high transparency could not be obtained.

According to Table 7, the optical filters according to Examples 1 to 36 satisfy the requirements (i) to (vii). According to Tables 11, 13, 15, 17, and 19, the optical filters according to Examples 1, 2, 16, 17, and 18 further satisfy the requirements (viii) to (xi): (viii) the absolute values of the differences between the second IR cut-off wavelength and the first IR cut-off wavelength are 3 nm (Example 1), 4 nm (Example 2), 4 nm (Example 16), 3 nm (Example 17), and 4 nm (Example 18); (ix) the absolute values of the differences between the third IR cut-off wavelength and first IR cut-off wavelength are 6 nm (Example 1), 7 nm (Example 2), 7 nm (Example 16), 6 nm (Example 17), and 7 nm (Example 18); (x) the absolute values of the differences between the second UV cut-off wavelength and the first UV cut-off wavelength are 2 nm (Example 1), 3 nm (Example 2), 3 nm (Example 16), 3 nm (Example 17), and 3 nm (Example 18); and (xi) the absolute values of the differences between the third UV cut-off wavelength and the first UV cut-off wavelength are 3 nm (Example 1), 5 nm (Example 2), 5 nm (Example 16), 5 nm (Example 17), and 4 nm (Example 18). According to the transmittance spectra (omitted from the drawings) shown by the optical filters according to Examples 3 to 15 and Examples 19 to 36 at incident angles ranging from 0° to 65°, the optical filters according to these Examples also further satisfy the requirements (viii) to (xi).

According to Table 9, the optical filter according to Comparative Example 1 does not satisfy the requirements (ii), (vi), and (vii), and does not have the desired properties in the infrared region. Additionally, Comparative Calculation Example 1 indicates that an increase in thickness of the light-absorbing layer can improve the infrared region properties but shortens the first IR cut-off wavelength, resulting in failure to achieve the optical characteristic (iii). These indicate that an optical filter satisfying all the requirements (i) to (iii) cannot be produced with the use of the light-absorbing composition according to Comparative Example 1. Likewise, the results for Comparative Example 2 and Comparative Calculation Example 2 and the results for Comparative Example 3 and Comparative Calculation Example 3 in Table 9 indicate that an optical filter satisfying all the requirements (i) to (iii) cannot be produced with the use of the light-absorbing compositions according to Comparative Examples 2 and 3.

According to Table 9, the optical filter according to Comparative Example 4 does not satisfy the requirements (i) and (iii). Comparative Calculation Example 4 indicates that a decrease in thickness of the light-absorbing layer increases the average transmittance in the wavelength range of 450 to 600 nm but does not change the IR cut-off wavelength very much, and also increases the maximum transmittance in the wavelength range of 750 to 1080 nm. These indicate that an optical filter satisfying all the requirements (i) to (iii) cannot be produced by the method for producing the optical filter according to Comparative Example 4. It is indicated that the humidification treatment not only promotes the hydrolysis and polycondensation of the alkoxysilane monomers in the light-absorbing composition to promote the curing of the light-absorbing layer, but also affects a transmittance spectrum of the optical filter.

According to Table 9, the optical filter according to Comparative Example 5 does not satisfy the requirement (iii). Comparative Calculation Example 5 indicates that a decrease in thickness of the light-absorbing layer can increase the IR cut-off wavelength but also increases the maximum transmittance in the wavelength range of 750 to 1080 nm. These indicate that an optical filter satisfying all the requirements (i) to (iii) cannot be produced by the method for producing the optical filter according to Comparative Example 5. In particular, it is indicated that the humidification treatment conditions in Comparative Example 5 are insufficient.

According to Table 9, the optical filter according to Comparative Example 6 does not satisfy the requirements (i) and (iii). Comparative Calculation Example 6 indicates that a decrease in thickness of the light-absorbing layer can increase the IR cut-off wavelength but also increases the maximum transmittance in the wavelength range of 750 to 1080 nm. These indicate that an optical filter having all the optical characteristics (i) to (iii) cannot be produced by the method for producing the optical filter according to Comparative Example 6. In particular, it is indicated that the humidification treatment conditions in Comparative Example 6 are insufficient.

As shown in Table 2, the light-absorbing composition according to Example 3 has the highest percentage content of n-butylphosphonic acid and the light-absorbing composition according to Example 5 has the lowest percentage content of n-butylphosphonic acid among the light-absorbing compositions according to Examples 3 to 5. This fact and Table 8 indicate that an increase in the percentage content of the alkyl-based phosphonic acid in the light-absorbing composition expands the wavelength range where the spectral transmittance is 1% or less within the wavelength range of 700 to 1200 nm to the long-wavelength side and expands the wavelength range where the spectral transmittance is 0.1% or less within the wavelength range of 700 to 1200 nm to the long-wavelength side. The same can be said for Examples 6 to 8, for Examples 9 and 10, and for Examples 11 to 15.

As shown in Table 2, the light-absorbing composition according to Example 11 has the highest percentage content of n-butylphosphonic acid, the light-absorbing composition according to Example 12 has the second highest percentage content of n-butylphosphonic acid, the light-absorbing composition according to Example 13 has the third highest percentage content of n-butylphosphonic acid, and the light-absorbing composition according to Example 15 has the lowest percentage content of n-butylphosphonic acid among the light-absorbing compositions according to Examples 11 to 15. According to the results for Examples 11 to 15 in Table 7, Example 11 is the lowest, Example 12 is the second lowest, Example 13 is the third lowest, and Example 15 is the highest in terms of the maximum transmittance of the optical filter in the wavelength range of 1000 to 1100 nm and the maximum transmittance of the optical filter in the wavelength range of 1100 to 1200 nm. These indicate that the performance of shielding against light with a wavelength in the infrared region is improved by increasing the percentage content of the alkyl-based phosphonic acid in the light-absorbing composition within the given range.

As shown in Table 2, the light-absorbing composition according to Example 7 has the highest percentage content of 4-bromophenylphosphonic acid and the light-absorbing composition according to Example 13 has the lowest percentage content of 4-bromophenylphosphonic acid among the light-absorbing compositions according to Examples 7, 10, and 13. According to the results for Examples 7, 10, and 13 in Table 7, the higher percentage content of 4-bromophenylphosphonic acid the light-absorbing composition has, the greater the UV cut-off wavelength is. This indicates that the optical characteristics, such as the UV cut-off wavelength, of the optical filter can be optimized by adjusting the percentage content of 4-bromophenylphosphonic acid in the light-absorbing composition.

The light-absorbing compositions using which the optical filters according to Examples 20 to 35 and Comparative Examples 4 to 6 were produced were prepared in the same manner as for the light-absorbing composition according to Example 2. However, as shown in Tables 7 to 10, the optical filters according to these Examples and these Comparative Examples have different optical characteristics from those of the optical filter according to Example 2. As described above, the humidification treatment was performed in order to promote the hydrolysis and polycondensation of the alkoxysilanes contained in the light-absorbing compositions. Depending on the conditions of the humidification treatment, the average transmittance in the wavelength range of 450 to 600 nm and the IR cut-off wavelength differed among the optical filters according to these Examples and these Comparative Examples.

According to the results for Comparative Calculation Examples 4 to 6 in Table 9, the UV cut-off wavelength can be adjusted by changing the thickness of the light-absorbing layer. However, by the methods for producing the optical filters according to Comparative Examples 4 to 6, it is difficult both to keep an IR cut-off wavelength within the desired range and also satisfy the optical characteristics (i) to (xi) exclusive of the optical characteristics related to the IR cut-off wavelength. Thus, for each of Examples or each of some Comparative Examples the amount of water vapor (water vapor exposure amount) in the environment to which the treated article had been exposed in the humidification treatment was determined as follows. The results are shown in Tables 3 and 6. A saturated water vapor pressure e [hPa] at a temperature t [° C.] was determined by Tetens' equation: $e=6.11\times10^{(7.5t/(t+237.3))}$. A water vapor concentration $\rho v$ [g/m$^3$] was determined using the saturated water vapor pressure e [hPa] and a relative humidity $\varphi$ [%] by the following equation: $\rho v=217\times e\times\varphi/(t+273.15)$. "Amount of water vapor×hour [mol/m$^3$ hour]" was defined as the water vapor exposure amount. As shown in Tables 3 and 6, it is indicated that when the temperature is 60° C. or more, the humidification treatment performed at a relative humidity of 70% or more for a treatment time of 1 hour or more results in achievement of good optical characteristics. These treatment conditions correspond to the conditions for achieving a water vapor exposure amount of 5.0 [mol/m$^3$ hour] or more. It is indicated that extending the treatment time to ensure a similar water vapor exposure amount results in achievement of good optical characteristics even when the temperature is as low as 40° C. and the relative humidity is 70% in the humidification treatment or even when the temperature is 60° C. and the relative humidity is as low as 40% in the humidification treatment. These results indicate that the humidification treatment is desirably performed for a short period of time in an environment at a temperature of 60° C. or more and a relative humidity of 70% or more to efficiently provide good optical characteristics for the optical filter.

TABLE 1

Material used and amount [g] thereof
Solution D (composition containing copper phenyl-based phosphonate)

| | Phenyl-based phosphonic acid | | | Phosphoric acid ester | | Alkoxysilane monomer | | Copper acetate |
| --- | --- | --- | --- | --- | --- | --- | --- | --- |
| | Phenyl-phosphonic acid [g] | 4-bromophenyl-phosphonic acid [g] | 4-fluorophenyl-phosphonic acid [g] | A208N [g] | A208F [g] | MTES [g] | TEOS [g] | monohydrate [g] |
| Ex. 1 | 0.441 | 0.661 | — | 0.412 | — | 1.934 | 0.634 | 1.125 |
| Ex. 2 | 0.176 | 1.058 | — | 0.412 | — | 2.166 | 0.710 | 1.125 |
| Ex. 3 | 0.176 | 1.058 | — | 0.412 | — | 2.166 | 0.710 | 1.125 |
| Ex. 4 | 0.176 | 1.058 | — | 0.412 | — | 2.166 | 0.710 | 1.125 |
| Ex. 5 | 0.176 | 1.058 | — | 0.412 | — | 2.166 | 0.710 | 1.125 |
| Ex. 6 | 0.176 | 1.058 | — | 0.412 | — | 2.166 | 0.710 | 1.125 |
| Ex. 7 | 0.176 | 1.058 | — | 0.412 | — | 2.166 | 0.710 | 1.125 |
| Ex. 8 | 0.176 | 1.058 | — | 0.412 | — | 2.166 | 0.710 | 1.125 |
| Ex. 9 | 0.265 | 0.925 | — | 0.412 | — | 2.166 | 0.710 | 1.125 |
| Ex. 10 | 0.265 | 0.925 | — | 0.412 | — | 2.166 | 0.710 | 1.125 |
| Ex. 11 | 0.441 | 0.661 | — | 0.412 | — | 2.166 | 0.710 | 1.125 |
| Ex. 12 | 0.441 | 0.661 | — | 0.412 | — | 2.166 | 0.710 | 1.125 |
| Ex. 13 | 0.441 | 0.661 | — | 0.412 | — | 2.166 | 0.710 | 1.125 |
| Ex. 14 | 0.441 | 0.661 | — | 0.412 | — | 2.166 | 0.710 | 1.125 |
| Ex. 15 | 0.441 | 0.661 | — | 0.412 | — | 2.166 | 0.710 | 1.125 |
| Ex. 16 | 0.176 | 1.058 | — | 0.412 | — | 2.166 | 0.710 | 1.125 |
| Ex. 17 | 0.176 | 1.058 | — | 0.412 | — | 2.166 | 0.710 | 1.125 |
| Ex. 18 | 0.176 | 1.058 | — | — | 0.412 | 2.166 | 0.710 | 1.125 |
| Ex. 19 | 0.441 | — | 0.476 | 0.412 | — | 2.166 | 0.710 | 1.125 |
| Ex. 36 | 0.176 | 1.058 | — | 0.412 | — | 2.166 | 0.710 | 1.125 |

Material used and amount [g] thereof

Solution H (composition containing copper alkyl-based phosphonate)

| | | Phosphoric acid ester | | Copper acetate | | Thickness [μm] of |
| --- | --- | --- | --- | --- | --- | --- |
| | Alkyl-based phosphonic acid n-butyl-phosphonic acid [g] | A208N [g] | A208F [g] | monohydrate [g] | Matrix (silicone resin) | light-absorbing layer |
| Ex. 1 | 0.144 | 0.129 | — | 0.225 | 2.200 | 170 |
| Ex. 2 | 0.289 | 0.257 | — | 0.450 | 2.200 | 135 |
| Ex. 3 | 0.433 | 0.386 | — | 0.675 | 1.257 | 178 |

TABLE 1-continued

|        |       |       |       |       |       |     |
|--------|-------|-------|-------|-------|-------|-----|
| Ex. 4  | 0.289 | 0.257 | —     | 0.450 | 1.257 | 154 |
| Ex. 5  | 0.144 | 0.129 | —     | 0.225 | 1.257 | 143 |
| Ex. 6  | 0.433 | 0.386 | —     | 0.675 | 2.200 | 212 |
| Ex. 7  | 0.289 | 0.257 | —     | 0.450 | 2.200 | 182 |
| Ex. 8  | 0.144 | 0.129 | —     | 0.225 | 2.200 | 162 |
| Ex. 9  | 0.433 | 0.386 | —     | 0.675 | 2.200 | 193 |
| Ex. 10 | 0.289 | 0.257 | —     | 0.450 | 2.200 | 152 |
| Ex. 11 | 0.433 | 0.386 | —     | 0.675 | 2.200 | 180 |
| Ex. 12 | 0.361 | 0.322 | —     | 0.563 | 2.200 | 171 |
| Ex. 13 | 0.289 | 0.257 | —     | 0.450 | 2.200 | 158 |
| Ex. 14 | 0.216 | 0.193 | —     | 0.338 | 2.200 | 152 |
| Ex. 15 | 0.144 | 0.129 | —     | 0.225 | 2.200 | 140 |
| Ex. 16 | 0.289 | 0.257 | —     | 0.450 | 2.200 | 132 |
| Ex. 17 | 0.289 | 0.257 | —     | 0.450 | 2.200 | 193 |
| Ex. 18 | 0.433 | —     | 0.386 | 0.675 | 2.200 | 198 |
| Ex. 19 | 0.289 | 0.257 | —     | 0.450 | 2.200 | 168 |
| Ex. 36 | 0.289 | 0.257 | —     | 0.450 | 2.200 | 168 |

TABLE 2

| | Solution D (composition containing copper phenyl-based phosphonate) | | | | | Solution H (composition containing copper alkyl-based phosphonate) | |
|---|---|---|---|---|---|---|---|
| | Phenyl-based phosphonic acid | | Alkoxysilane monomer | | Copper acetate | Alkyl-based phosphonic acid | Copper acetate |
| | Phenyl- phosphonic acid [mol] | Halogenated phenylphosphonic acid [mol] | MTES [mol] | TEOS [mol] | monohydrate [mol] | n-butyl- phosphonic acid [mol] | monohydrate [mol] |
| Ex. 1  | 0.00279 | 0.00279 | 0.0108 | 0.00304 | 0.00563 | 0.00104 | 0.00113 |
| Ex. 2  | 0.00112 | 0.00446 | 0.0121 | 0.00341 | 0.00563 | 0.00209 | 0.00225 |
| Ex. 3  | 0.00112 | 0.00446 | 0.0121 | 0.00341 | 0.00563 | 0.00313 | 0.00338 |
| Ex. 4  | 0.00112 | 0.00446 | 0.0121 | 0.00341 | 0.00563 | 0.00209 | 0.00225 |
| Ex. 5  | 0.00112 | 0.00446 | 0.0121 | 0.00341 | 0.00563 | 0.00104 | 0.00113 |
| Ex. 6  | 0.00112 | 0.00446 | 0.0121 | 0.00341 | 0.00563 | 0.00313 | 0.00338 |
| Ex. 7  | 0.00112 | 0.00446 | 0.0121 | 0.00341 | 0.00563 | 0.00209 | 0.00225 |
| Ex. 8  | 0.00112 | 0.00446 | 0.0121 | 0.00341 | 0.00563 | 0.00104 | 0.00113 |
| Ex. 9  | 0.00167 | 0.00390 | 0.0121 | 0.00341 | 0.00563 | 0.00313 | 0.00338 |
| Ex. 10 | 0.00167 | 0.00390 | 0.0121 | 0.00341 | 0.00563 | 0.00209 | 0.00225 |
| Ex. 11 | 0.00279 | 0.00279 | 0.0121 | 0.00341 | 0.00563 | 0.00313 | 0.00338 |
| Ex. 12 | 0.00279 | 0.00279 | 0.0121 | 0.00341 | 0.00563 | 0.00261 | 0.00282 |
| Ex. 13 | 0.00279 | 0.00279 | 0.0121 | 0.00341 | 0.00563 | 0.00209 | 0.00225 |
| Ex. 14 | 0.00279 | 0.00279 | 0.0121 | 0.00341 | 0.00563 | 0.00157 | 0.00169 |
| Ex. 15 | 0.00279 | 0.00279 | 0.0121 | 0.00341 | 0.00563 | 0.00104 | 0.00113 |
| Ex. 16 | 0.00112 | 0.00446 | 0.0121 | 0.00341 | 0.00563 | 0.00209 | 0.00225 |
| Ex. 17 | 0.00112 | 0.00446 | 0.0121 | 0.00341 | 0.00563 | 0.00209 | 0.00225 |
| Ex. 18 | 0.00112 | 0.00446 | 0.0121 | 0.00341 | 0.00563 | 0.00313 | 0.00338 |
| Ex. 19 | 0.00279 | 0.00271 | 0.0121 | 0.00341 | 0.00563 | 0.00209 | 0.00225 |
| Ex. 36 | 0.00112 | 0.00446 | 0.0121 | 0.00341 | 0.00563 | 0.00209 | 0.00225 |

| | Amount-of-substance ratio of halogenated phenylphosphonic acid to phenylphosphonic acid | Amount-of-substance ratio of phenyl-based phosphonic acid to alkyl-based phosphonic acid | Percentage content (mol %) of each phosphonic acid with respect to total phosphonic acids | | |
|---|---|---|---|---|---|
| | | | Phenyl- phosphonic acid | 4-bromophenyl- phosphonic acid | n-butyl- phosphonic acid |
| Ex. 1  | 1.0 | 5.4 | 42.1 | 42.1 | 15.7 |
| Ex. 2  | 4.0 | 2.7 | 14.6 | 58.1 | 27.2 |
| Ex. 3  | 4.0 | 1.8 | 12.9 | 51.2 | 35.9 |
| Ex. 4  | 4.0 | 2.7 | 14.6 | 58.1 | 27.2 |
| Ex. 5  | 4.0 | 5.4 | 16.9 | 67.4 | 15.7 |
| Ex. 6  | 4.0 | 1.8 | 12.9 | 51.2 | 35.9 |
| Ex. 7  | 4.0 | 2.7 | 14.6 | 58.1 | 27.2 |
| Ex. 8  | 4.0 | 5.4 | 16.9 | 67.4 | 15.7 |
| Ex. 9  | 2.3 | 1.8 | 19.2 | 44.8 | 36.0 |
| Ex. 10 | 2.3 | 2.7 | 21.8 | 50.9 | 27.3 |
| Ex. 11 | 1.0 | 1.8 | 32.0 | 32.0 | 35.9 |
| Ex. 12 | 1.0 | 2.1 | 34.1 | 34.1 | 31.9 |
| Ex. 13 | 1.0 | 2.7 | 36.4 | 36.4 | 27.2 |
| Ex. 14 | 1.0 | 3.6 | 39.0 | 39.0 | 22.0 |
| Ex. 15 | 1.0 | 5.4 | 42.1 | 42.1 | 15.7 |

TABLE 2-continued

|  |  |  |  |  |  |
|---|---|---|---|---|---|
| Ex. 16 | 4.0 | 2.7 | 14.6 | 58.1 | 27.2 |
| Ex. 17 | 4.0 | 2.7 | 14.6 | 58.1 | 27.2 |
| Ex. 18 | 4.0 | 1.8 | 12.9 | 51.2 | 35.9 |
| Ex. 19 | 1.0 | 2.6 | 36.8 | 35.7 | 27.5 |
| Ex. 36 | 4.0 | 2.7 | 14.6 | 58.1 | 27.2 |

TABLE 3

|  | Conditions of heat treatment for curing film | Conditions of humidification treatment | Water vapor exposure amount [mol/m³ · hour] | Thickness [µm] of light-absorbing layer |
|---|---|---|---|---|
| Examples 1 to 19 | 85° C.: 6 hours | 85° C. 85% RH: 20 hours | 332.3 | See Table 1 |
| Example 20 | 85° C.: 6 hours | 85° C. 85% RH: 1 hour | 16.6 | 179 |
| Example 21 | 85° C.: 6 hours | 85° C. 85% RH: 2 hours | 33.2 | 177 |
| Example 22 | 85° C.: 6 hours | 85° C. 85% RH: 60 hours | 997.2 | 170 |
| Example 23 | 85° C.: 6 hours | 60° C. 90% RH: 1 hour | 6.5 | 170 |
| Example 24 | 85° C.: 6 hours | 60° C. 90% RH: 2 hours | 13.0 | 175 |
| Example 25 | 85° C.: 6 hours | 60° C. 90% RH: 20 hours | 129.8 | 174 |
| Example 26 | 85° C.: 6 hours | 60° C. 90% RH: 60 hours | 389.4 | 168 |
| Example 27 | 85° C.: 6 hours | 60° C. 70% RH: 1 hour | 5.1 | 175 |
| Example 28 | 85° C.: 6 hours | 60° C. 70% RH: 2 hours | 10.1 | 178 |
| Example 29 | 85° C.: 6 hours | 60° C. 70% RH: 20 hours | 101.0 | 160 |
| Example 30 | 85° C.: 6 hours | 60° C. 70%: 60 hours | 303.0 | 164 |
| Example 31 | 85° C.: 6 hours | 60° C. 40%: 7 hours | 20.2 | 215 |
| Example 32 | 85° C.: 6 hours | 40° C. 70% RH: 14 hours | 27.9 | 190 |
| Example 33 | 85° C.: 6 hours | 60° C. 40% RH: 3 hours | 8.7 | 154 |
| Example 34 | 85° C.: 6 hours | 60° C. 40% RH: 5 hours | 14.5 | 152 |
| Example 35 | 85° C.: 6 hours | 40° C. 70% RH: 4 hours | 8.0 | 153 |
| Example 36 | 85° C.: 6 hours | 85° C. 85% RH: 20 hours | 332.3 | 168 |

TABLE 4

| | Material used and amount [g] thereof Solution D (composition containing copper phenyl-based phosphonate) | | | | | | |
|---|---|---|---|---|---|---|---|
| | Phenyl-based phosphonic acid | | Phosphoric acid ester | | Alkoxysilane monomer | | Copper acetate |
| | Phenyl-phosphonic acid [g] | 4-bromophenyl-phosphonic acid [g] | A208N [g] | A208F [g] | MTES [g] | TEOS [g] | monohydrate [g] |
| Comparative Example 1 | 0.441 | 0.661 | 0.412 | 0 | 2.166 | 0.710 | 1.125 |
| Comparative Example 2 | 0.582 | 0.374 | 0.624 | 0 | 2.321 | 0.761 | 1.125 |
| Comparative Example 3 | 0.832 | 0 | 0 | 0.624 | 1.274 | 1.012 | 1.125 |
| Comparative Example 4 | 0.176 | 1.058 | 0.412 | 0 | 2.166 | 0.710 | 1.125 |
| Comparative Example 5 | 0.176 | 1.058 | 0.412 | 0 | 2.166 | 0.710 | 1.125 |
| Comparative Example 6 | 0.176 | 1.058 | 0.412 | 0 | 2.166 | 0.710 | 1.125 |
| Comparative Example 7 | 0.441 | 0.661 | 0.412 | 0 | 2.166 | 0.710 | 1.125 |
| Comparative Example 8 | 0 | 0 | 0 | 0 | 0 | 0 | 0 |

TABLE 4-continued

| | Solution H (composition containing copper alkyl-based phosphonate) | | | | | |
|---|---|---|---|---|---|---|
| | Alkyl-based phosphonic acid n-butyl-phosphonic acid [g] | Phosphoric acid ester A208N [g] | Phosphoric acid ester A208F [g] | Copper acetate monohydrate [g] | Matrix (silicone resin) | Thickness [μm] of light-absorbing layer |
| Comparative Example 1 | 0 | 0 | 0 | 0 | 2.200 | 126 |
| Comparative Example 2 | 0 | 0 | 0 | 0 | 4.400 | 217 |
| Comparative Example 3 | 0 | 0 | 0 | 0 | 4.400 | 198 |
| Comparative Example 4 | 0.289 | 0.257 | 0 | 0.450 | 2.200 | 191 |
| Comparative Example 5 | 0.289 | 0.257 | 0 | 0.450 | 2.200 | 217 |
| Comparative Example 6 | 0.289 | 0.257 | 0 | 0.450 | 2.200 | 218 |
| Comparative Example 7 | 0.134 | 0 | 0.178 | 0.225 | 2.200 | — |
| Comparative Example 8 | 0.722 | 0.643 | 0 | 1.125 | 2.200 | — |

TABLE 5

| | Solution D (composition containing copper phenyl-based phosphonate) | | | | |
|---|---|---|---|---|---|
| | Phenyl-phosphonic acid [mol] | 4-bromophenyl-phosphonic acid [mol] | MTES [mol] | TEOS [mol] | Copper acetate monohydrate [mol] |
| Comparative Example 1 | 0.00279 | 0.00279 | 0.0121 | 0.00341 | 0.00563 |
| Comparative Example 2 | 0.00368 | 0.00158 | 0.0130 | 0.00365 | 0.00563 |
| Comparative Example 3 | 0.00526 | 0 | 0.00715 | 0.00486 | 0.00563 |
| Comparative Example 4 | 0.00112 | 0.00446 | 0.0121 | 0.00341 | 0.00563 |
| Comparative Example 5 | 0.00112 | 0.00446 | 0.0121 | 0.00341 | 0.00563 |
| Comparative Example 6 | 0.00112 | 0.00446 | 0.0121 | 0.00341 | 0.00563 |
| Comparative Example 7 | 0.00279 | 0.00279 | 0.0121 | 0.00341 | 0.00563 |
| Comparative Example 8 | 0 | 0 | 0 | 0 | 0 |

| | Solution H (composition containing copper alkyl-based phosphonate) | | Content ratio (mol) between phosphonic acids in total phosphonic acids | | |
|---|---|---|---|---|---|
| | Alkyl-based phosphonic acid n-butyl-phosphonic acid [mol] | Copper acetate monohydrate [mol] | 4-bromophenyl-phosphonic acid | Phenyl-phosphonic acid | n-butyl-phosphonic acid |
| Comparative Example 1 | 0 | 0 | 50.0 | 50.0 | 0.0 |
| Comparative Example 2 | 0 | 0 | 70.0 | 30.0 | 0.0 |

TABLE 5-continued

| | | | | | |
|---|---|---|---|---|---|
| Comparative Example 3 | 0 | 0 | 100.0 | 0.0 | 0.0 |
| Comparative Example 4 | 0.00209 | 0.00225 | 14.6 | 58.1 | 27.2 |
| Comparative Example 5 | 0.00209 | 0.00225 | 14.6 | 58.1 | 27.2 |
| Comparative Example 6 | 0.00209 | 0.00225 | 14.6 | 58.1 | 27.2 |
| Comparative Example 7 | 0.000970 | 0.00113 | 42.6 | 42.6 | 14.8 |
| Comparative Example 8 | 0.00522 | 0.00563 | 0.0 | 0.0 | 100.0 |

TABLE 6

| | Conditions of heat treatment for curing film | Conditions of humidification treatment | Water vapor exposure amount [mol/m$^3$ · hour] |
|---|---|---|---|
| Comparative Example 1 | 85° C.: 6 hours | 85° C. 85% RH: 20 hours | 332.3 |
| Comparative Example 2 | 85° C.: 3 hours, 125° C.: 3 hours, 150° C.: 1 hour, 170° C.: 3 hours | 85° C. 85% RH: 4 hours | 66.5 |
| Comparative Example 3 | 85° C.: 3 hours, 125° C.: 3 hours, 150° C.: 1 hour, 170° C.: 3 hours | 85° C. 85% RH: 20 hours | 332.3 |
| Comparative Example 4 | 85° C.: 6 hours | — | — |
| Comparative Example 5 | 85° C.: 6 hours | 60° C. 40% RH: 1 hour | 2.9 |
| Comparative Example 6 | 85° C.: 6 hours | 40° C. 70% RH: 1 hour | 2.0 |

TABLE 7

| | Visible region properties | Infrared region properties | | |
|---|---|---|---|---|
| | Requirement | | | |
| Example | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm |
| Ex. 1 | 85.48 | 0.99 | 1.60 | 12.11 |
| Ex. 2 | 85.67 | 0.44 | 0.72 | 5.82 |
| Ex. 3 | 80.82 | 0.05 | 0.01 | 0.50 |
| Ex. 4 | 82.83 | 0.08 | 0.13 | 2.41 |
| Ex. 5 | 83.41 | 0.72 | 1.21 | 10.61 |
| Ex. 6 | 81.68 | 0.05 | 0.01 | 0.44 |
| Ex. 7 | 82.92 | 0.08 | 0.13 | 2.28 |
| Ex. 8 | 82.46 | 0.77 | 1.29 | 11.04 |
| Ex. 9 | 81.00 | 0.05 | 0.01 | 0.38 |
| Ex. 10 | 82.52 | 0.09 | 0.15 | 2.40 |
| Ex. 11 | 83.49 | 0.07 | 0.04 | 0.87 |
| Ex. 12 | 83.00 | 0.08 | 0.12 | 1.94 |
| Ex. 13 | 83.01 | 0.22 | 0.37 | 4.42 |
| Ex. 14 | 82.62 | 0.36 | 0.61 | 6.50 |
| Ex. 15 | 84.14 | 0.81 | 1.36 | 11.52 |
| Ex. 16 | 83.99 | 0.43 | 0.71 | 5.70 |
| Ex. 17 | 84.75 | 0.06 | 0.08 | 1.96 |
| Ex. 18 | 82.40 | 0.07 | 0.04 | 0.96 |
| Ex. 19 | 83.23 | 0.07 | 0.04 | 1.03 |
| Ex. 20 | 85.22 | 0.10 | 0.17 | 2.64 |
| Ex. 21 | 85.61 | 0.09 | 0.15 | 2.50 |
| Ex. 22 | 84.94 | 0.08 | 0.11 | 2.03 |
| Ex. 23 | 84.51 | 0.16 | 0.26 | 3.27 |
| Ex. 24 | 85.83 | 0.17 | 0.27 | 3.27 |
| Ex. 25 | 85.79 | 0.13 | 0.22 | 2.96 |
| Ex. 26 | 85.42 | 0.12 | 0.20 | 2.91 |

TABLE 7-continued

| | | | | |
|---|---|---|---|---|
| Ex. 27 | 84.19 | 0.21 | 0.33 | 3.62 |
| Ex. 28 | 84.78 | 0.19 | 0.30 | 3.34 |
| Ex. 29 | 85.66 | 0.13 | 0.21 | 3.00 |
| Ex. 30 | 85.98 | 0.12 | 0.20 | 2.84 |
| Ex. 31 | 84.11 | 0.11 | 0.07 | 1.10 |
| Ex. 32 | 83.49 | 0.12 | 0.17 | 2.13 |
| Ex. 33 | 84.53 | 0.94 | 0.72 | 4.46 |
| Ex. 34 | 85.36 | 0.95 | 0.78 | 4.80 |
| Ex. 35 | 83.77 | 0.91 | 0.69 | 4.25 |
| Ex. 36 | 80.61 | 0.30 | 0.40 | 3.70 |

| | Ultraviolet region properties | | Cut-off wavelength properties | | |
|---|---|---|---|---|---|
| | Requirement | | | | |
| Example | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] | Thickness [μm] of light-absorbing layer |
| Ex. 1 | 0.00 | 0.02 | 629 | 391 | 170 |
| Ex. 2 | 0.03 | 0.03 | 639 | 407 | 135 |
| Ex. 3 | 0.00 | 0.00 | 634 | 413 | 178 |
| Ex. 4 | 0.00 | 0.00 | 634 | 412 | 154 |
| Ex. 5 | 0.00 | 0.00 | 633 | 412 | 143 |
| Ex. 6 | 0.00 | 0.00 | 634 | 413 | 212 |
| Ex. 7 | 0.00 | 0.00 | 633 | 411 | 182 |
| Ex. 8 | 0.00 | 0.00 | 633 | 413 | 162 |
| Ex. 9 | 0.00 | 0.00 | 634 | 407 | 193 |
| Ex. 10 | 0.00 | 0.00 | 633 | 406 | 152 |
| Ex. 11 | 0.00 | 0.00 | 630 | 398 | 180 |
| Ex. 12 | 0.00 | 0.00 | 630 | 399 | 171 |
| Ex. 13 | 0.00 | 0.00 | 629 | 398 | 158 |
| Ex. 14 | 0.00 | 0.00 | 631 | 400 | 152 |
| Ex. 15 | 0.00 | 0.00 | 632 | 399 | 140 |
| Ex. 16 | 0.03 | 0.03 | 638 | 408 | 132 |
| Ex. 17 | 0.00 | 0.00 | 632 | 408 | 193 |
| Ex. 18 | 0.00 | 0.00 | 632 | 409 | 198 |
| Ex. 19 | 0.00 | 0.01 | 630 | 393 | 168 |
| Ex. 20 | 0.00 | 0.00 | 632 | 406 | 179 |
| Ex. 21 | 0.00 | 0.00 | 633 | 406 | 177 |
| Ex. 22 | 0.00 | 0.00 | 632 | 408 | 170 |
| Ex. 23 | 0.00 | 0.00 | 629 | 403 | 170 |
| Ex. 24 | 0.00 | 0.00 | 630 | 404 | 175 |
| Ex. 25 | 0.00 | 0.00 | 631 | 404 | 174 |
| Ex. 26 | 0.00 | 0.00 | 632 | 405 | 168 |
| Ex. 27 | 0.00 | 0.00 | 627 | 403 | 175 |
| Ex. 28 | 0.00 | 0.00 | 627 | 404 | 178 |
| Ex. 29 | 0.00 | 0.00 | 630 | 403 | 160 |
| Ex. 30 | 0.00 | 0.00 | 631 | 403 | 164 |
| Ex. 31 | 0.00 | 0.00 | 620 | 406 | 215 |
| Ex. 32 | 0.00 | 0.00 | 623 | 404 | 190 |
| Ex. 33 | 0.00 | 0.01 | 628 | 402 | 154 |
| Ex. 34 | 0.00 | 0.01 | 632 | 402 | 152 |
| Ex. 35 | 0.00 | 0.02 | 625 | 400 | 153 |
| Ex. 36 | 0.00 | 0.02 | 635 | 412 | 168 |

TABLE 8

| | | Infrared region properties | | | | Ultraviolet region properties | |
|---|---|---|---|---|---|---|---|
| Example | Visible region properties Wavelength range [nm] in which transmittance is 78% or more | Maximum transmittance [%] in wavelength range of 800 to 950 nm | Maximum transmittance [%] in wavelength range of 800 to 1000 nm | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| Ex. 1 | 408 to 599 | 0.08 | 0.18 | 713 to 1080 | 753 to 965 | 300 to 368 | 300 to 363 |
| Ex. 2 | 430 to 609 | 0.28 | 0.28 | 730 to 1120 | 778 to 910 | 300 to 378 | 300 to 369 |
| Ex. 3 | 456 to 602 | 0.00 | 0.00 | 713 to 1200 | 743 to 1156 | 300 to 383 | 300 to 376 |
| Ex. 4 | 440 to 603 | 0.00 | 0.01 | 713 to 1167 | 746 to 1089 | 300 to 383 | 300 to 376 |

TABLE 8-continued

| | | Infrared region properties | | | | Ultraviolet region properties | |
|---|---|---|---|---|---|---|---|
| | | Maximum | Maximum | | | | |
| Example | Visible region properties Wavelength range [nm] in which transmittance is 78% or more | transmittance [%] in wavelength range of 800 to 950 nm | transmittance [%] in wavelength range of 800 to 1000 nm | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| Ex. 5 | 436 to 602 | 0.04 | 0.11 | 713 to 1092 | 752 to 994 | 300 to 384 | 300 to 377 |
| Ex. 6 | 443 to 603 | 0.00 | 0.00 | 713 to 1200 | 743 to 1160 | 300 to 384 | 300 to 377 |
| Ex. 7 | 437 to 603 | 0.00 | 0.01 | 713 to 1170 | 747 to 1091 | 300 to 382 | 300 to 376 |
| Ex. 8 | 448 to 602 | 0.04 | 0.12 | 713 to 1090 | 752 to 990 | 300 to 384 | 300 to 377 |
| Ex. 9 | 443 to 602 | 0.00 | 0.00 | 713 to 1200 | 743 to 1165 | 300 to 379 | 300 to 373 |
| Ex. 10 | 435 to 602 | 0.01 | 0.02 | 713 to 1167 | 747 to 1086 | 300 to 379 | 300 to 373 |
| Ex. 11 | 421 to 598 | 0.00 | 0.01 | 713 to 1200 | 746 to 1133 | 300 to 373 | 300 to 367 |
| Ex. 12 | 428 to 599 | 0.01 | 0.02 | 713 to 1176 | 747 to 1094 | 300 to 373 | 300 to 368 |
| Ex. 13 | 423 to 597 | 0.02 | 0.05 | 713 to 1138 | 750 to 1043 | 300 to 373 | 300 to 367 |
| Ex. 14 | 429 to 600 | 0.02 | 0.06 | 713 to 1119 | 750 to 1023 | 300 to 374 | 300 to 369 |
| Ex. 15 | 422 to 602 | 0.04 | 0.13 | 713 to 1087 | 752 to 988 | 300 to 375 | 300 to 369 |
| Ex. 16 | 434 to 606 | 0.27 | 0.27 | 730 to 1120 | 778 to 910 | 300 to 378 | 300 to 370 |
| Ex. 17 | 431 to 602 | 0.00 | 0.00 | 711 to 1127 | 743 to 1103 | 300 to 380 | 300 to 374 |
| Ex. 18 | 433 to 601 | 0.00 | 0.01 | 713 to 1200 | 745 to 1130 | 300 to 380 | 300 to 374 |
| Ex. 19 | 419 to 599 | 0.00 | 0.00 | 713 to 1199 | 745 to 1132 | 300 to 369 | 300 to 364 |
| Ex. 20 | 424 to 601 | 0.01 | 0.02 | 713 to 1163 | 748 to 1079 | 300 to 379 | 300 to 373 |
| Ex. 21 | 424 to 603 | 0.01 | 0.02 | 713 to 1167 | 747 to 1085 | 300 to 380 | 300 to 374 |
| Ex. 22 | 429 to 602 | 0.00 | 0.01 | 713 to 1175 | 746 to 1097 | 300 to 381 | 300 to 375 |
| Ex. 23 | 421 to 598 | 0.01 | 0.03 | 713 to 1152 | 750 to 1059 | 300 to 377 | 300 to 371 |
| Ex. 24 | 420 to 600 | 0.01 | 0.04 | 713 to 1151 | 750 to 1056 | 300 to 378 | 300 to 372 |
| Ex. 25 | 421 to 601 | 0.01 | 0.03 | 713 to 1157 | 749 to 1067 | 300 to 379 | 300 to 373 |
| Ex. 26 | 423 to 602 | 0.01 | 0.02 | 713 to 1159 | 748 to 1072 | 300 to 379 | 300 to 373 |
| Ex. 27 | 422 to 595 | 0.02 | 0.05 | 713 to 1146 | 753 to 1044 | 300 to 377 | 300 to 370 |
| Ex. 28 | 422 to 595 | 0.02 | 0.04 | 713 to 1149 | 753 to 1049 | 300 to 377 | 300 to 371 |
| Ex. 29 | 420 to 600 | 0.01 | 0.02 | 713 to 1157 | 750 to 1069 | 300 to 377 | 300 to 371 |
| Ex. 30 | 420 to 601 | 0.01 | 0.02 | 713 to 1160 | 749 to 1074 | 300 to 377 | 300 to 371 |
| Ex. 31 | 425 to 587 | 0.01 | 0.01 | 713 to 1196 | 753 to 1115 | 300 to 379 | 300 to 372 |
| Ex. 32 | 423 to 590 | 0.01 | 0.03 | 713 to 1170 | 754 to 1073 | 300 to 377 | 300 to 371 |
| Ex. 33 | 420 to 591 | 0.15 | 0.25 | 749 to 1121 | 806 to 922 | 300 to 373 | 300 to 366 |
| Ex. 34 | 420 to 595 | 0.15 | 0.26 | 749 to 1116 | 806 to 923 | 300 to 373 | 300 to 366 |
| Ex. 35 | 420 to 586 | 0.14 | 0.25 | 748 to 1123 | 807 to 923 | 300 to 372 | 300 to 364 |
| Ex. 36 | 465 to 591 | 0.25 | 0.25 | 725 to 1147 | 764 to 977 | 300 to 380 | 300 to 372 |

TABLE 9

| | Visible region properties | Infrared region properties | | |
|---|---|---|---|---|
| | | Requirement | | |
| Example | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm |
| Comparative Example 1 | 86.06 | 7.21 | 11.63 | 48.16 |
| Comparative Calculation Example 1 | 82.84 | 1.64 | 3.49 | 33.05 |
| Comparative Example 2 | 86.13 | 7.02 | 11.20 | 46.57 |
| Comparative Calculation Example 2 | 82.83 | 1.50 | 3.16 | 30.93 |
| Comparative Example 3 | 84.68 | 7.61 | 12.13 | 49.45 |
| Comparative Calculation Example 3 | 81.06 | 2.02 | 4.13 | 35.54 |
| Comparative Example 4 | 76.14 | 0.27 | 0.21 | 1.68 |
| Comparative Calculation Example 4 | 79.29 | 1.00 | 0.82 | 4.14 |

TABLE 9-continued

| Example | | | | |
|---|---|---|---|---|
| Comparative Example 5 | 79.81 | 0.16 | 0.08 | 1.04 |
| Comparative Calculation Example 5 | 83.03 | 1.00 | 0.59 | 3.74 |
| Comparative Example 6 | 77.34 | 0.20 | 0.10 | 1.08 |
| Comparative Calculation Example 6 | 80.78 | 1.00 | 0.58 | 3.44 |

| | Ultraviolet region properties | | Cut-off wavelength properties | | |
|---|---|---|---|---|---|
| | Requirement | | | | |
| Example | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] | Thickness [μm] of light-absorbing layer |
| Comparative Example 1 | 0.00 | 0.00 | 632 | 400 | 126 |
| Comparative Calculation Example 1 | 0.00 | 0.00 | 619 | 407 | 200 |
| Comparative Example 2 | 0.00 | 0.00 | 632 | 395 | 217 |
| Comparative Calculation Example 2 | 0.00 | 0.00 | 619 | 402 | 347 |
| Comparative Example 3 | 0.00 | 0.02 | 631 | 391 | 198 |
| Comparative Calculation Example 3 | 0.00 | 0.00 | 619 | 398 | 303 |
| Comparative Example 4 | 0.00 | 0.00 | 600 | 409 | 191 |
| Comparative Calculation Example 4 | 0.00 | 0.04 | 601 | 404 | 148 |
| Comparative Example 5 | 0.00 | 0.00 | 605 | 408 | 217 |
| Comparative Calculation Example 5 | 0.00 | 0.01 | 618 | 403 | 155 |
| Comparative Example 6 | 0.00 | 0.00 | 600 | 407 | 218 |
| Comparative Calculation Example 6 | 0.00 | 0.04 | 609 | 402 | 161 |

TABLE 10

| | Visible region properties | Infrared region properties | | | | Ultraviolet region properties | |
|---|---|---|---|---|---|---|---|
| Example | Wavelength range [nm] in which transmittance is 78% or more | Maximum transmittance [%] in wavelength range of 800 to 950 nm | Maximum transmittance [%] in wavelength range of 800 to 1000 nm | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| Comparative Example 1 | 424 to 603 | 0.36 | 1.06 | 713 to 996 | 764 to 904 | 300 to 375 | 300 to 369 |
| Comparative Calculation Example 1 | 462 to 593 | 0.01 | 0.08 | 686 to 1067 | 710 to 1006 | 300 to 380 | 300 to 375 |
| Comparative Example 2 | 417 to 603 | 0.36 | 1.07 | 713 to 996 | 761 to 907 | 300 to 371 | 300 to 366 |
| Comparative Calculation Example 2 | 441 to 592 | 0.01 | 0.07 | 686 to 1069 | 709 to 1008 | 300 to 376 | 300 to 372 |

TABLE 10-continued

| | Visible region properties | Infrared region properties | | | | Ultraviolet region properties | |
|---|---|---|---|---|---|---|---|
| | | Maximum | Maximum | | | | |
| Example | Wavelength range [nm] in which transmittance is 78% or more | transmittance [%] in wavelength range of 800 to 950 nm | transmittance [%] in wavelength range of 800 to 1000 nm | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| Comparative Example 3 | 421 to 601 | 0.37 | 1.17 | 713 to 992 | 762 to 908 | 300 to 367 | 300 to 363 |
| Comparative Calculation Example 3 | 450 to 590 | 0.02 | 0.11 | 688 to 1061 | 712 to 996 | 300 to 372 | 300 to 367 |
| Comparative Example 4 | 438 to 557 | 0.04 | 0.08 | 714 to 1178 | 776 to 1024 | 300 to 375 | 300 to 368 |
| Comparative Calculation Example 4 | 430 to 564 | 0.25 | 0.40 | 750 to 1116 | 839 to 850 | 300 to 371 | 300 to 362 |
| Comparative Example 5 | 432 to 569 | 0.01 | 0.02 | 714 to 1198 | 760 to 1111 | 300 to 378 | 300 to 371 |
| Comparative Calculation Example 5 | 423 to 579 | 0.15 | 0.23 | 750 to 1133 | 811 to 937 | 300 to 373 | 300 to 365 |
| Comparative Example 6 | 435 to 561 | 0.02 | 0.03 | 714 to 1197 | 766 to 1101 | 300 to 375 | 300 to 369 |
| Comparative Calculation Example 6 | 425 to 571 | 0.17 | 0.25 | 750 to 1135 | 818 to 919 | 300 to 370 | 300 to 362 |

TABLE 11

| | Visible region properties | Infrared region properties | | | Ultraviolet region properties | | Cut-off wavelength properties | |
|---|---|---|---|---|---|---|---|---|
| | | | | | Requirement | | | |
| Incident angle [°] | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] |
| 0 | 85.48 | 0.99 | 1.60 | 12.11 | 0.00 | 0.02 | 629 | 391 |
| 30 | 83.99 | 0.88 | 1.44 | 11.36 | 0.00 | 0.02 | 627 | 392 |
| 35 | 83.35 | 0.83 | 1.37 | 11.04 | 0.00 | 0.01 | 626 | 392 |
| 40 | 82.63 | 0.79 | 1.31 | 10.71 | 0.00 | 0.01 | 626 | 393 |
| 45 | 81.75 | 0.75 | 1.26 | 10.30 | 0.00 | 0.01 | 625 | 393 |
| 50 | 80.49 | 0.71 | 1.19 | 9.85 | 0.00 | 0.01 | 623 | 394 |
| 55 | 78.06 | 0.67 | 1.12 | 9.31 | 0.00 | 0.01 | 621 | 395 |
| 60 | 73.14 | 0.00 | 1.03 | 8.57 | 0.00 | 0.00 | 618 | 398 |
| 65 | 65.87 | 0.56 | 0.93 | 7.67 | 0.00 | 0.00 | 612 | 402 |

TABLE 12

| | Visible region properties | Infrared region properties | | Ultraviolet region properties | |
|---|---|---|---|---|---|
| Incident angle [°] | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 0 | 413 to 594 | 713 to 1080 | 753 to 965 | 300 to 368 | 300 to 363 |
| 30 | 418 to 590 | 710 to 1085 | 748 to 970 | 300 to 369 | 300 to 363 |
| 35 | 420 to 589 | 709 to 1087 | 746 to 980 | 300 to 369 | 300 to 364 |
| 40 | 421 to 586 | 707 to 1088 | 744 to 981 | 300 to 369 | 300 to 364 |
| 45 | 425 to 584 | 706 to 1091 | 743 to 986 | 300 to 370 | 300 to 364 |
| 50 | 439 to 580 | 705 to 1092 | 741 to 991 | 300 to 370 | 300 to 365 |

TABLE 12-continued

| | Visible region properties | Infrared region properties | | Ultraviolet region properties | |
|---|---|---|---|---|---|
| Incident angle [°] | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 55 | 478 to 571 | 703 to 1095 | 738 to 991 | 300 to 370 | 300 to 365 |
| 60 | — | 702 to 1099 | 736 to 996 | 300 to 371 | 300 to 366 |
| 65 | — | 699 to 1102 | 733 to 1003 | 300 to 371 | 300 to 366 |

TABLE 13

| | Visible region properties | Infrared region properties | | | Ultraviolet region properties | | Cut-off wavelength properties | |
|---|---|---|---|---|---|---|---|---|
| | Requirement | | | | | | | |
| Incident angle [°] | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] |
| 0 | 85.67 | 0.44 | 0.72 | 5.82 | 0.03 | 0.03 | 639 | 407 |
| 30 | 83.30 | 0.38 | 0.62 | 5.24 | 0.02 | 0.02 | 637 | 409 |
| 35 | 82.72 | 0.37 | 0.61 | 5.17 | 0.02 | 0.02 | 636 | 409 |
| 40 | 81.52 | 0.36 | 0.61 | 4.97 | 0.02 | 0.02 | 635 | 410 |
| 45 | 80.19 | 0.37 | 0.56 | 4.81 | 0.03 | 0.03 | 634 | 411 |
| 50 | 78.56 | 0.38 | 0.56 | 4.68 | 0.02 | 0.03 | 632 | 412 |
| 55 | 75.76 | 0.36 | 0.55 | 4.52 | 0.02 | 0.02 | 630 | 414 |
| 60 | 71.73 | 0.00 | 0.54 | 4.30 | 0.03 | 0.03 | 627 | 416 |
| 65 | 66.20 | 0.35 | 0.55 | 4.05 | 0.03 | 0.03 | 621 | 420 |

TABLE 14

| | Visible region properties | Infrared region properties | | Ultraviolet region properties | |
|---|---|---|---|---|---|
| Incident angle [°] | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 0 | 438 to 603 | 730 to 1120 | 778 to 910 | 300 to 378 | 300 to 369 |
| 30 | 456 to 598 | 726 to 1123 | 771 to 974 | 300 to 379 | 300 to 372 |
| 35 | 462 to 596 | 725 to 1124 | 771 to 923 | 300 to 379 | 300 to 372 |
| 40 | 467 to 593 | 724 to 1127 | 768 to 950 | 300 to 380 | 300 to 373 |
| 45 | 472 to 589 | 723 to 1128 | 768 to 956 | 300 to 380 | 300 to 373 |
| 50 | 482 to 582 | 721 to 1129 | 766 to 1004 | 300 to 381 | 300 to 373 |
| 55 | 527 to 560 | 720 to 1130 | 765 to 971 | 300 to 381 | 300 to 374 |
| 60 | — | 718 to 1134 | 762 to 981 | 300 to 382 | 300 to 375 |
| 65 | — | 716 to 1134 | 761 to 982 | 300 to 382 | 300 to 375 |

TABLE 15

| | Visible region properties | Infrared region properties | | | Ultraviolet region properties | | Cut-off wavelength properties | |
|---|---|---|---|---|---|---|---|---|
| | Requirement | | | | | | | |
| Incident angle [°] | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] |
| 0 | 83.99 | 0.43 | 0.71 | 5.70 | 0.03 | 0.03 | 638 | 408 |
| 30 | 81.67 | 0.38 | 0.61 | 5.14 | 0.02 | 0.02 | 636 | 409 |
| 35 | 81.09 | 0.36 | 0.59 | 5.06 | 0.02 | 0.02 | 635 | 410 |

TABLE 15-continued

|  | Visible region properties | Infrared region properties | | Ultraviolet region properties | | Cut-off wavelength properties | |
| --- | --- | --- | --- | --- | --- | --- | --- |
|  | Requirement | | | | | | |
|  | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iv) Maximum transmittance [%] in wavelength range of 300 to 350 nm | (iv) Maximum transmittance [%] in wavelength range of 300 to 360 nm | (iii) IR cut-off wavelength [nm] | (v) UV cut-off wavelength [nm] |
| Incident angle [°] | | | | | | | | |
| 40 | 79.92 | 0.35 | 0.60 | 4.88 | 0.02 | 0.02 | 634 | 411 |
| 45 | 78.62 | 0.37 | 0.55 | 4.71 | 0.03 | 0.03 | 633 | 412 |
| 50 | 77.02 | 0.37 | 0.55 | 4.59 | 0.02 | 0.03 | 631 | 413 |
| 55 | 74.28 | 0.35 | 0.54 | 4.43 | 0.02 | 0.02 | 629 | 414 |
| 60 | 70.32 | 0.00 | 0.53 | 4.21 | 0.03 | 0.03 | 625 | 417 |
| 65 | 64.90 | 0.34 | 0.54 | 3.97 | 0.03 | 0.03 | 619 | 422 |

TABLE 16

| Incident angle [°] | Visible region properties | Infrared region properties | | Ultraviolet region properties | |
| --- | --- | --- | --- | --- | --- |
| | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 0 | 446 to 600 | 730 to 1120 | 778 to 910 | 300 to 378 | 300 to 370 |
| 30 | 466 to 594 | 726 to 1124 | 771 to 956 | 300 to 379 | 300 to 372 |
| 35 | 469 to 592 | 725 to 1125 | 769 to 976 | 300 to 379 | 300 to 372 |
| 40 | 473 to 588 | 723 to 1127 | 768 to 943 | 300 to 380 | 300 to 373 |
| 45 | 480 to 583 | 722 to 1128 | 767 to 961 | 300 to 380 | 300 to 373 |
| 50 | 499 to 573 | 721 to 1130 | 765 to 1009 | 300 to 381 | 300 to 373 |
| 55 | — | 719 to 1132 | 765 to 854 | 300 to 381 | 300 to 374 |
| 60 | — | 718 to 1135 | 761 to 852 | 300 to 382 | 300 to 375 |
| 65 | — | 716 to 1132 | 761 to 982 | 300 to 382 | 300 to 375 |

TABLE 17

|  | Visible region properties | Infrared region properties | | | Ultraviolet region properties | | Cut-off wavelength properties | |
| --- | --- | --- | --- | --- | --- | --- | --- | --- |
|  | Requirement | | | | | | | |
|  | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iii) Maximum transmittance [%] in wavelength range of 300 to 350 nm | (iii) Maximum transmittance [%] in wavelength range of 300 to 360 nm | (iv) IR cut-off wavelength [nm] | (v) UV cut-off wavelength [nm] |
| Incident angle [°] | | | | | | | | |
| 0 | 84.75 | 0.06 | 0.08 | 1.96 | 0.00 | 0.00 | 632 | 408 |
| 30 | 83.73 | 0.04 | 0.07 | 1.69 | 0.00 | 0.00 | 630 | 410 |
| 35 | 83.25 | 0.04 | 0.05 | 1.62 | 0.00 | 0.00 | 630 | 410 |
| 40 | 82.55 | 0.03 | 0.05 | 1.55 | 0.00 | 0.00 | 629 | 411 |
| 45 | 81.04 | 0.03 | 0.05 | 1.46 | 0.00 | 0.00 | 628 | 412 |
| 50 | 79.25 | 0.03 | 0.05 | 1.37 | 0.00 | 0.00 | 626 | 413 |
| 55 | 77.06 | 0.03 | 0.04 | 1.26 | 0.00 | 0.00 | 624 | 414 |
| 60 | 73.44 | 0.00 | 0.03 | 1.17 | 0.00 | 0.00 | 620 | 417 |
| 65 | 67.66 | 0.02 | 0.03 | 1.04 | 0.00 | 0.00 | 616 | 420 |

TABLE 18

| | Visible region properties | Infrared region properties | | Ultraviolet region properties | |
| --- | --- | --- | --- | --- | --- |
| Incident angle [°] | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 0 | 439 to 596 | 711 to 1177 | 778 to 910 | 300 to 380 | 300 to 374 |
| 30 | 444 to 594 | 708 to 1182 | 739 to 1109 | 300 to 382 | 300 to 375 |
| 35 | 447 to 593 | 708 to 1183 | 738 to 1110 | 300 to 382 | 300 to 376 |
| 40 | 454 to 591 | 706 to 1185 | 737 to 1113 | 300 to 382 | 300 to 376 |
| 45 | 466 to 588 | 705 to 1187 | 734 to 1118 | 300 to 383 | 300 to 377 |
| 50 | 474 to 582 | 704 to 1189 | 733 to 1120 | 300 to 383 | 300 to 377 |
| 55 | 493 to 569 | 702 to 1191 | 731 to 1121 | 300 to 384 | 300 to 378 |
| 60 | — | 700 to 1194 | 728 to 1121 | 300 to 385 | 300 to 378 |
| 65 | — | 698 to 1199 | 726 to 1130 | 300 to 385 | 300 to 379 |

TABLE 19

| | Visible region properties | Infrared region properties | | | Ultraviolet region properties | | Cut-off wavelength properties | |
| --- | --- | --- | --- | --- | --- | --- | --- | --- |
| | Requirement | | | | | | | |
| Incident angle [°] | (i) Average transmittance [%] in wavelength range of 450 to 600 nm | (ii) Maximum transmittance [%] in wavelength range of 750 to 1080 nm | (vi) Maximum transmittance [%] in wavelength range of 1000 to 1100 nm | (vii) Maximum transmittance [%] in wavelength range of 1100 to 1200 nm | (iii) Maximum transmittance [%] in wavelength range of 300 to 350 nm | (iii) Maximum transmittance [%] in wavelength range of 300 to 360 nm | (iv) IR cut-off wavelength [nm] | (v) UV cut-off wavelength [nm] |
| 0 | 85.36 | 0.04 | 0.01 | 0.34 | 0.00 | 0.00 | 634 | 407 |
| 30 | 83.91 | 0.03 | 0.02 | 0.28 | 0.00 | 0.00 | 631 | 409 |
| 35 | 83.28 | 0.03 | 0.01 | 0.27 | 0.00 | 0.00 | 631 | 409 |
| 40 | 82.56 | 0.03 | 0.01 | 0.25 | 0.00 | 0.00 | 630 | 410 |
| 45 | 81.51 | 0.03 | 0.01 | 0.24 | 0.00 | 0.00 | 629 | 411 |
| 50 | 79.71 | 0.03 | 0.01 | 0.21 | 0.00 | 0.00 | 627 | 411 |
| 55 | 77.53 | 0.03 | 0.01 | 0.21 | 0.00 | 0.00 | 625 | 412 |
| 60 | 74.21 | 0.00 | 0.01 | 0.19 | 0.00 | 0.00 | 621 | 415 |
| 65 | 69.45 | 0.01 | 0.01 | 0.16 | 0.00 | 0.00 | 616 | 419 |

TABLE 20

| | Visible region properties | Infrared region properties | | Ultraviolet region properties | |
| --- | --- | --- | --- | --- | --- |
| Incident angle [°] | Wavelength range [nm] in which transmittance is 78% or more | Wavelength range [nm] in which transmittance is 1% or less | Wavelength range [nm] in which transmittance is 0.1% or less | Wavelength range [nm] in which transmittance is 1% or less | Wavelength range [nm] in which transmittance is 0.1% or less |
| 0 | 434 to 598 | 712 to 1200 | 778 to 910 | 300 to 380 | 300 to 373 |
| 30 | 440 to 595 | 709 to 1200 | 737 to 1174 | 300 to 381 | 300 to 375 |
| 35 | 443 to 593 | 708 to 1200 | 736 to 1175 | 300 to 381 | 300 to 375 |
| 40 | 447 to 591 | 707 to 1200 | 735 to 1176 | 300 to 382 | 300 to 375 |
| 45 | 458 to 589 | 706 to 1200 | 733 to 1179 | 300 to 382 | 300 to 376 |
| 50 | 472 to 584 | 705 to 1200 | 732 to 1179 | 300 to 382 | 300 to 376 |
| 55 | 488 to 572 | 703 to 1200 | 730 to 1182 | 300 to 383 | 300 to 377 |
| 60 | — | 701 to 1200 | 728 to 1184 | 300 to 384 | 300 to 378 |
| 65 | — | 699 to 1200 | 726 to 1186 | 300 to 384 | 300 to 378 |

The invention claimed is:

1. An optical filter comprising:
a light-absorbing layer having, at an incident angle of 0 degree, an average transmittance of 78% or more in the wavelength range of 450 nm to 600 nm, a maximum transmittance of 1% or less in the wavelength range of 740 nm to 1080 nm, a decreasing spectral transmittance with increasing wavelength in the wavelength range of 600 nm to 750 nm, and a first IR cut-off wavelength corresponding to 50% transmittance in the wavelength range of 620 nm to 680 nm.

2. The optical filter according to claim 1, the light-absorbing layer, at an incident angle of 0 degree, having a maximum transmittance of 1% or less in the wavelength range of 300 to 350 nm.

3. The optical filter according to claim 1,
the light-absorbing layer, at an incident angle of 0 degree, having an increasing spectral transmittance with increasing wavelength in the wavelength range of 350 nm to 450 nm and a first UV cut-off wavelength corresponding to 50% transmittance in the wavelength range of 380 nm to 430 nm.

4. The optical filter according to claim 1, the light-absorbing layer comprising a light absorber including a phosphonic acid and copper ion.

5. The optical filter according to claim 4, the phosphonic acid including a first phosphonic acid with an aryl group.

6. The optical filter according to claim 5, the first phosphonic acid having a phenyl group and/or a phenyl group in which at least one hydrogen atom is substituted with a halogen atom.

7. The optical filter according to claim 5, the phosphonic acid further including a second phosphonic acid with an alkyl group.

8. The optical filter according to claim 1, further comprising a transparent dielectric substrate covered with the light-absorbing layer.

9. A camera-equipped information device comprising:
a lens system;
an imaging sensor receiving light transmitted through the lens system; and
the optical filter according to claim 1, disposed ahead of the lens system, configured to protect the lens system.

10. The optical filter according to claim 1, the light-absorbing layer, at incident angle of 0 degree, having a maximum transmittance of 3% or less in the wavelength range of 1000 nm to 1100 nm.

11. The optical filter according to claim 1, the light-absorbing layer, at incident angle of 40 degree, having a second IR cut-off wavelength corresponding to 50% transmittance, and
wherein an absolute value of the difference between the first IR cut-off wavelength and the second IR cut-off wavelength is 5 nm or less.

12. The optical filter according to claim 1, the light-absorbing layer, at incident angle of 40 degree, having a second UV cut-off wavelength corresponding to 50% transmittance, and
wherein an absolute value of the difference between the first UV cut-off wavelength and the UV second cut-off wavelength is 5 nm or less.

13. The optical filter according to claim 1, the light-absorbing layer, at incident angle of 50 degree, having a third IR cut-off wavelength corresponding to 50% transmittance, and
wherein an absolute value of the difference between the first IR cut-off wavelength and the third IR cut-off wavelength is 15 nm or less.

14. The optical filter according to claim 1, the light-absorbing layer, at incident angle of 50 degree, having a third UV cut-off wavelength corresponding to 50% transmittance, and
wherein an absolute value of the difference between the first UV cut-off wavelength and the third UV cut-off wavelength is 15 nm or less.

* * * * *